(12) United States Patent
Ito et al.

(10) Patent No.: US 11,789,995 B2
(45) Date of Patent: Oct. 17, 2023

(54) IMAGE PROCESSING DEVICE, IMAGE PROCESSING METHOD, PROGRAM, AND RECORDING MEDIUM

(71) Applicant: FUJIFILM Corporation, Tokyo (JP)

(72) Inventors: Naoya Ito, Tokyo (JP); Tomohiro Nakagawa, Tokyo (JP); Yukinori Yokoyama, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/748,889

(22) Filed: Jan. 22, 2020

(65) Prior Publication Data

US 2020/0272652 A1 Aug. 27, 2020

(30) Foreign Application Priority Data

Feb. 22, 2019 (JP) ................................. 2019-030933

(51) Int. Cl.
*G06F 16/538* (2019.01)
*G06F 16/532* (2019.01)
*G06F 16/58* (2019.01)

(52) U.S. Cl.
CPC .......... *G06F 16/532* (2019.01); *G06F 16/538* (2019.01); *G06F 16/5866* (2019.01)

(58) Field of Classification Search
None
See application file for complete search history.

(56) References Cited

U.S. PATENT DOCUMENTS

| 9,886,182 B1 | 2/2018 | Minks-Brown et al. |
| 2006/0080342 A1 | 4/2006 | Takaki |

(Continued)

FOREIGN PATENT DOCUMENTS

| CN | 101211371 A | 7/2008 |
| CN | 103631844 A | 3/2014 |

(Continued)

OTHER PUBLICATIONS

"How to use Hashtags" https://help.twitter.com/en/using-twitter/how-to-use-hashtags (Year: 2022).*

(Continued)

*Primary Examiner* — Hosain T Alam
*Assistant Examiner* — Anthony G Gemignani
(74) *Attorney, Agent, or Firm* — Studebaker & Brackett PC

(57) ABSTRACT

In an image processing device, an image processing method, a program, and a recording medium, a searching condition is a condition for searching for an image from an image group according to a condition other than an imaging timing, an image designating unit designates, as a designation search image, one search image selected from search images displayed on a display unit according to a command from the user, and an image display unit displays, as time-series images, the designation search image and at least a part of images which are included in the image group and captured earlier and later than an imaging timing of the designation search image in a sequence of time on the display unit according to a command from the user after only the designation search image is displayed on the display unit in a case where the designation search image is designated.

13 Claims, 22 Drawing Sheets

(56) References Cited

U.S. PATENT DOCUMENTS

| | | | |
|---|---|---|---|
| 2008/0189270 A1 | 8/2008 | Takimoto et al. | |
| 2008/0256488 A1 | 10/2008 | Van De Sluis et al. | |
| 2014/0059079 A1* | 2/2014 | Oka | G06F 16/2468 |
| | | | 707/780 |
| 2014/0093175 A1 | 4/2014 | Morimoto et al. | |
| 2015/0116540 A1 | 4/2015 | Gilman | |
| 2015/0186381 A1* | 7/2015 | Yan | G06F 16/16 |
| | | | 707/728 |
| 2015/0310042 A1 | 10/2015 | Murakami et al. | |
| 2016/0110031 A1* | 4/2016 | Johnson | G06F 16/387 |
| | | | 715/716 |
| 2016/0359993 A1* | 12/2016 | Hendrickson | G06F 16/951 |
| 2018/0025215 A1 | 1/2018 | Yousef et al. | |

FOREIGN PATENT DOCUMENTS

| | | |
|---|---|---|
| CN | 103714108 A | 4/2014 |
| CN | 104508702 A | 4/2015 |
| JP | 2006-031530 A | 2/2006 |
| JP | 2006-107260 A | 4/2006 |
| JP | 2009124270 A | 6/2009 |
| JP | 5216591 B2 | 6/2013 |

OTHER PUBLICATIONS

Toda Satoru.; "Toda Satoru's Life hack. Smart office with using digital tools"; PC-webzine (PC-web Magazine) 2018; vol. 317; total 5 pages; Japan.

An Office Action; "Notice of Reasons for Refusal," mailed by the Japanese Patent Office dated Feb. 8, 2022, which corresponds to Japanese Patent Application No. 2019-030933 and is related to U.S. Appl. No. 16/748,889 with English language translation.

An Office Action mailed by China National Intellectual Property Administration dated Aug. 22, 2022, which corresponds o Chinese Patent Application No. 202010091881.8 and is related to U.S. Appl. No. 16/748,889; with English language translation.

An Office Action mailed by China National Intellectual Property Administration dated Jan. 5, 2023, which corresponds to Chinese Patent Application No. 202010091881.8 and is related to U.S. Appl. No. 16/748,889; with English language translation.

An Office Action; "Notice of Reasons for Refusal," mailed by the Japanese Patent Office dated Mar. 22, 2023, which corresponds to Japanese Patent Application No. 2022-063222 and is related to U.S. Appl. No. 16/748,889 with English language translation.

Anonymous, "Cut Deeply to Deepest Part of Windows Transcendence Registry Customization Way", weekly..ascii.jp, Dec. 16, 2008, vol. 715, p. 192. ASCII Media Works, Japan.

An Office Action; "Notice of Reasons for Refusal," mailed by the Japanese Patent Office dated Jul. 11, 2023, which corresponds to Japanese Patent Application No. 2022-063222 and is related to U.S. Appl. No. 16/748,889 with English language translation.

"Aix Risc System /6000 AIXWindows", OSF/Motif Programmer's Guide Release 1.1, Dec. 24, 2002, pp. 6-13 to 6-14, IBM, Japan.

* cited by examiner

IMAGE PROCESSING DEVICE, IMAGE PROCESSING METHOD, PROGRAM, AND RECORDING MEDIUM

CROSS-REFERENCE TO RELATED APPLICATIONS

The present application claims priority under 35U.S.C. § 119 to Japanese Patent Application No. 2019-0309330, filed on Feb. 22, 2019. Each of the above application(s) is hereby expressly incorporated by reference, in its entirety, into the present application.

BACKGROUND OF THE INVENTION

1. Field of the Invention

The present invention relates to an image processing device, an image processing method, a program, and a recording medium which search for an image from an image group based on a searching condition and display an image as a searching result on a display unit.

2. Description of the Related Art

For example, in a case where a user searches for a desired image from an image group retained in a smartphone, a method in which the user displays a list (thumbnail image) of images included in the image group in a sequence of time on a display unit and searches for the desired image while going back in time to the list of images in a sequence of time is used. A method in which the user inputs a keyword for searching for an image from the image group and searches for an image matching the keyword by using additional information of the image such as tag information is known.

However, in the method in which the list of images is displayed while going back in time to the list of images, it is very difficult to search for a desired image from a large amount of images included in the image group. In the method in which the image is searched for by inputting the keyword, the desired image can be appropriately searched for in a case where the keyword to be used is clear, but it is very difficult to search for the desired image in a case where the keyword is not clear.

Here, the related arts related to the present invention include JP2009-124270A and JP5216591B.

JP2009-124270A describes that image data is searched for by searching for a character string based on additional information assigned to the image data. For example, JP2009-124270A describes that the image data including the additional information matching the input character string is searched for by searching for the image by using any of AND and OR operators of a character string of exchangeable image file format (Exif) desired to be searched for and a character string of a tag desired to be searched for and the image data corresponding to the searching result is displayed.

JP5216591B describes that a user selects another set of images by displaying a plurality of attributes and attribute values related to a digital image in a label and selecting the attribute value displayed in the label. JP5216591B describes that the user searches for all images of a specific person, displays the images in a sequence of time, and displays labels related to the images at the time of browsing the selected set of the images.

SUMMARY OF THE INVENTION

JP2009-124270A describes that the image is searched for by using the AND operator of the character string of the plurality of additional information items. However, since the user needs to input the character string desired to be searched for, it is not possible to intuitively search for the image.

JP5216591B describes that another set of images is browsed by selecting one of the attribute values of one digital image. However, since the set of images corresponding to only one attribute value can be merely browsed, it is not possible to narrow the images by using, for example, the plurality of attribute values.

An online photo service of the related art may have a function of transmitting a notification for prompting the user to browse the image to the user and prompting the user to browse a past image owned by the user.

For example, after the notification for prompting the user to browse the image is transmitted to the user, in a case where the notification is opened by the user, collage images created by using images selected from an image group of "2015, Jan. 10" owned by the user are displayed on the display unit, as shown in FIG. 20.

Subsequently, in a case where a button of "display other photos" displayed on a lower side of the collage images is pressed by the user, an image group of "Jan. 10 (Saturday), 2015" which is the same imaging day as that of the images used as the collage images is displayed on the display unit in descending order of an imaging timing of the image, as shown in FIG. 21.

The user can sequentially display the image group captured at imaging days earlier and later than the imaging day in order of the imaging timings of the images by moving the image group displayed on the display unit upward or downward.

For example, in a case where the image group displayed on the display unit is moved upward, for example, an image group of "Jan. 9 (Friday), 2015" which is an imaging day which is earlier than and is closest to "Jan. 10 (Saturday), 2015" is displayed on the display unit. Meanwhile, in a case where the image group displayed on the display unit is moved downward, for example, an image group of "Jan. 18 (Sunday), 2015" which is an imaging day which is later than and is closest to "Jan. 10 (Saturday), 2015" is displayed on the display unit.

As stated above, the online photo service of the related art has a function of displaying the image group of the same imaging day as that of the images used as the collage images in a sequence of time by following a button of "display other photos" from the collage images.

The collage images included in the notification for prompting the user to browse the image are searched for according to the searching condition related to the imaging timing of the images of "Jan. 10 (Saturday), 2015" and are created by using the images selected from the image group of the imaging day of "Jan. 10 (Saturday), 2015". Accordingly, the image group of the imaging day of "Jan. 10 (Saturday), 2015" which is captured earlier and later than the imaging timing of the images used as the collage images from the collage images can be displayed in a sequence of time.

However, the online photo service of the related art does not have a function of displaying the images captured earlier and later than the imaging timing of one image from the images searched for according to any condition other than the imaging timing of the image in a sequence of time.

In the online photo service of the related art, in a case where the image corresponding to the keyword is searched for from the image group, the image group corresponding to the keyword is displayed on the display unit in descending order of the imaging timing of the image for each imaging day.

For example, in a case where the images corresponding to the keyword of "soccer" are searched for from the image group, nine images corresponding to the soccer are hit from the image group of "Dec. 5 (Saturday), 2015", as shown in FIG. 22.

Here, in a case where a button of "downward arrow" displayed on a right side of the display of "Dec. 5 (Saturday), 2015" is pressed, all images included in the image group of "Dec. 5 (Saturday), 2015" including images which are not related to the soccer are displayed, and the button of "downward arrow" is changed to a button of "upward arrow". In a case where the button of "upward arrow" is pressed, nine images corresponding to the soccer are displayed again, and the button of "upward arrow" is returned to the button of "downward arrow".

As shown in FIG. 22, in a case where the images are searched for by the keyword of "soccer", an imaging date when the images corresponding to "soccer" are hit is "Nov. 28, 2015" earlier than the imaging day of "Dec. 5 (Saturday), 2015" when the images corresponding to "soccer" are hit.

Here, in a case where the screen is returned to the list screen of the time-series images on which all the images included in the image group are displayed in order of the imaging timing and the image group of "Dec. 5 (Saturday), 2015" is found, it is assumed that, in the list of the time-series images, an imaging date of the next image of "Dec. 5 (Saturday), 2015" is "Dec. 6 (Sunday), 2015", and an imaging date of the previous image of "Dec. 5 (Saturday), 2015" is "Dec. 4 (Friday), 2015".

As stated above, in a case where the images are searched for by the keyword of "soccer" from the image group, the online photo service of the related art has a function of displaying the images of the imaging day on which the images corresponding to "soccer" are present for each imaging day.

However, for example, the online photo service of the related art does not have a function of displaying the images captured earlier and later than the imaging timing of one image from the list of the images of the hit imaging day in a sequence of time with one action of pressing the button. In other words, the user needs to move the images to the imaging day desired to be displayed by storing the imaging day desired to be displayed on the list of the time-series images and displaying the list of the time-series images is displayed.

An object of the present invention is to provide an image processing device, an image processing method, a program, and a recording medium which are capable of displaying images captured earlier and later than an imaging timing of one image from one image of a list of images searched for according to a condition other than an imaging timing of the image in a sequence of time.

In order to achieve the aforementioned object, the present invention provides an image processing device comprising a command obtaining unit that obtains a command input from a user, an image searching unit that searches for images matching a searching condition input according to a command from the user, as search images, from an image group, an image display unit that displays images included in the image group on a display unit, and an image designating unit that designates one image selected from the images displayed on the display unit according to a command from the user. The searching condition is a condition for searching for an image from the image group according to a condition other than an imaging timing, the image designating unit designates, as a designation search image, one search image selected from the search images displayed on the display unit according to a command from the user, and the image display unit displays, as time-series images, the designation search image and at least a part of images which are included in the image group and captured earlier and later than an imaging timing of the designation search image in a sequence of time on the display unit according to a command from the user after only the designation search image is displayed on the display unit in a case where the designation search image is designated.

It is preferable that the image display unit sequentially displays only one search image captured earlier or later than the imaging timing of the designation search image from the search images on the display unit in order of the search images captured in a sequence of time from the imaging timing of the designation search image whenever a command from the user is input after only the designation search image is displayed on the display unit.

It is preferable that the image designating unit designates, as a designation time-series image, one time-series image selected from the time-series images displayed on the display unit according to a command from the user, and the image display unit sequentially displays only one image captured earlier or later than an imaging timing of the designation time-series image on the display unit from the image group in order of the images captured in a sequence of time from the imaging timing of the designation time-series image whenever a command from the user is input after only the designation time-series image is displayed on the display unit in a case where the designation time-series image is designated.

It is preferable that the image searching unit includes a tag information display unit that displays tag information assigned to the images included in the image group on the display unit, a tag information designating unit that designates, as selection tag information, tag information selected from the tag information displayed on the display unit according to a command from the user, and an image extracting unit that extracts, as the search images, the images to which the selection tag information are assigned from the image group. It is preferable that the tag information display unit displays at least a part of all the tag information assigned to all the images included in the image group on the display unit, the tag information designating unit designates, as first selection tag information, first tag information selected from the tag information displayed on the display unit according to a command from the user, the image extracting unit extracts, as first search images, the images to which the first selection tag information is assigned from the image group, the image display unit displays at least a part of all the first search images on the display unit, and the tag information display unit displays at least a part of all the tag information assigned to all the first search images on the display unit.

It is preferable that the tag information designating unit simultaneously designates, as second selection tag information, second tag information selected from the tag information displayed on the display unit according to a command from the user in addition to the first selection tag information, the image extracting unit extracts, as second search images, the first search images to which the second selection tag information is assigned from the first search images, the image display unit displays at least a part of all the second search images on the display unit, and the tag information display unit displays at least a part of all the tag information assigned to all the second search images on the display unit.

It is preferable that the tag information designating unit simultaneously designates, as the selection tag information, two or more tag information selected from the tag information displayed on the display unit according to a command from the user, the image extracting unit extracts, as the search images, the images to which all the two or more selection tag information are assigned from the image group, the image display unit displays at least a part of all the search images on the display unit, and the tag information display unit displays at least a part of all the tag information assigned to all the search images on the display unit.

The present invention provides an image processing method comprising a step of obtaining, by a command obtaining unit, a command input from a user, a step of searching for, by an image searching unit, images matching a searching condition input according to a command from the user, as search images, from an image group, a step of displaying, by an image display unit, images included in the image group on a display unit, and a step of designating, by an image designating unit, one image selected from the images displayed on the display unit according to a command from the user. The searching condition is a condition for searching for an image from the image group according to a condition other than an imaging timing, one search image selected from the search images displayed on the display unit is designated as a designation search image according to a command from the user, and the designation search image and at least a part of images which are included in the image group and captured earlier and later than an imaging timing of the designation search image are displayed as time-series images in a sequence of time on the display unit according to a command from the user after only the designation search image is displayed on the display unit in a case where the designation search image is designated.

The present invention provides a program causing a computer to execute the steps of the image processing method.

The present invention provides a computer-readable recording medium having a program causing a computer to execute the steps of the image processing method recorded thereon.

The present invention provides an image processing device comprising a command obtaining unit that obtains a command input from a user, an image searching unit that searches for images matching a searching condition input according to a command from the user, as search images, from an image group, an image display unit that displays images included in the image group on a display unit, and an image designating unit that designates one image selected from the images displayed on the display unit according to a command from the user. The command obtaining unit, the image searching unit, the image display unit, and the image designating unit are hardware or processors that execute programs. The searching condition is a condition for searching for an image from the image group according to a condition other than an imaging timing, the image designating unit designates, as a designation search image, one search image selected from the search images displayed on the display unit according to a command from the user, and the image display unit displays, as time-series images, the designation search image and at least a part of images which are included in the image group and captured earlier and later than an imaging timing of the designation search image in a sequence of time on the display unit according to a command from the user after only the designation search image is displayed on the display unit in a case where the designation search image is designated.

Here, it is preferable that the image searching unit includes a tag information display unit that displays tag information assigned to images included in an image group on a display unit, a tag information designating unit that designates, as selection tag information, tag information selected from the tag information displayed on the display unit according to a command from the user, and an image extracting unit that extracts, as search images, the images to which the selection tag information is assigned from the image group. It is preferable that the tag information display unit, the tag information designating unit, and the image extracting unit are hardware or processors that execute programs. It is preferable that the tag information display unit displays at least a part of all the tag information assigned to all the images included in the image group on the display unit, the tag information designating unit designates, as first selection tag information, first tag information selected from the tag information displayed on the display unit according to a command from the user, the image extracting unit extracts, as first search images, images to which the first selection tag information is assigned from the image group, the image display unit displays at least a part of all the first search images on the display unit, and the tag information display unit displays at least a part of all the tag information assigned to all the first search images on the display unit.

According to the present invention, in order to display the images captured earlier and later than the imaging timing of one search image, the user does not need to return to the screen to the list screen of the images, and can display and browse the images captured earlier and later than the imaging timing of the designation search image in a sequence of time according to the command from the user.

DESCRIPTION OF THE PREFERRED EMBODIMENTS

Hereinafter, an image processing device, an image processing method, a program, and a recording medium according to an embodiment of the present invention will be described in detail based on preferred embodiments shown in the accompanying drawings.

Figure 1:
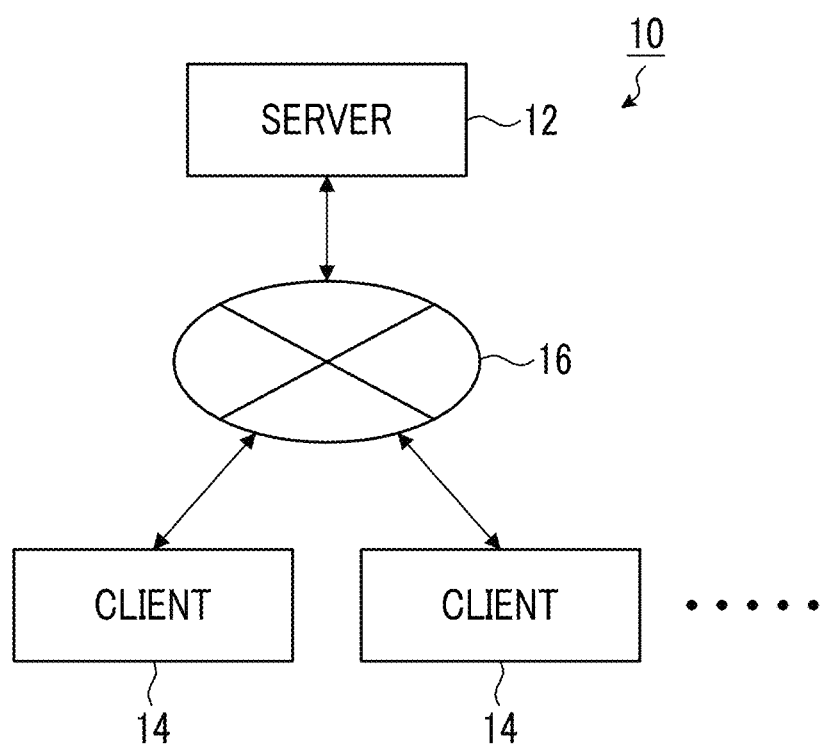
FIG. 1 is a block diagram of an embodiment showing a configuration of an image processing system according to an embodiment of the present invention.

FIG. 1 is a block diagram of an embodiment showing a configuration of an image processing system according to the embodiment of the present invention. An image processing system 10 shown in FIG. 1 comprises a server 12, and a plurality of clients 14 connected to the server 12 via a network 16.

The server 12 has a function of obtaining an image group owned by each of a plurality of users who uses the image processing system 10, retaining each image included in the image group owned by each user, and sharing the image with only a sharing partner designated by each user.

The number of servers 12 is not limited to one, but a plurality of servers may be used. The server is a workstation including a control device, a storage device, and a communication device.

The client 14 is the image processing device according to the embodiment of the present invention, and has a function of searching for the image from the image group owned by the user based on a searching condition, more specifically, by using tag information assigned to the image as an image searching condition and displaying the image as the searching result on a display unit.

The client 14 is a desktop personal computer (PC), a laptop PC, a tablet PC, or a portable terminal such as a portable phone and a smartphone that includes a control device, an input device, a storage device, a communication device, and a display.

Hereinafter, an example in which the client 14 is a smartphone will be described.

Figure 2:
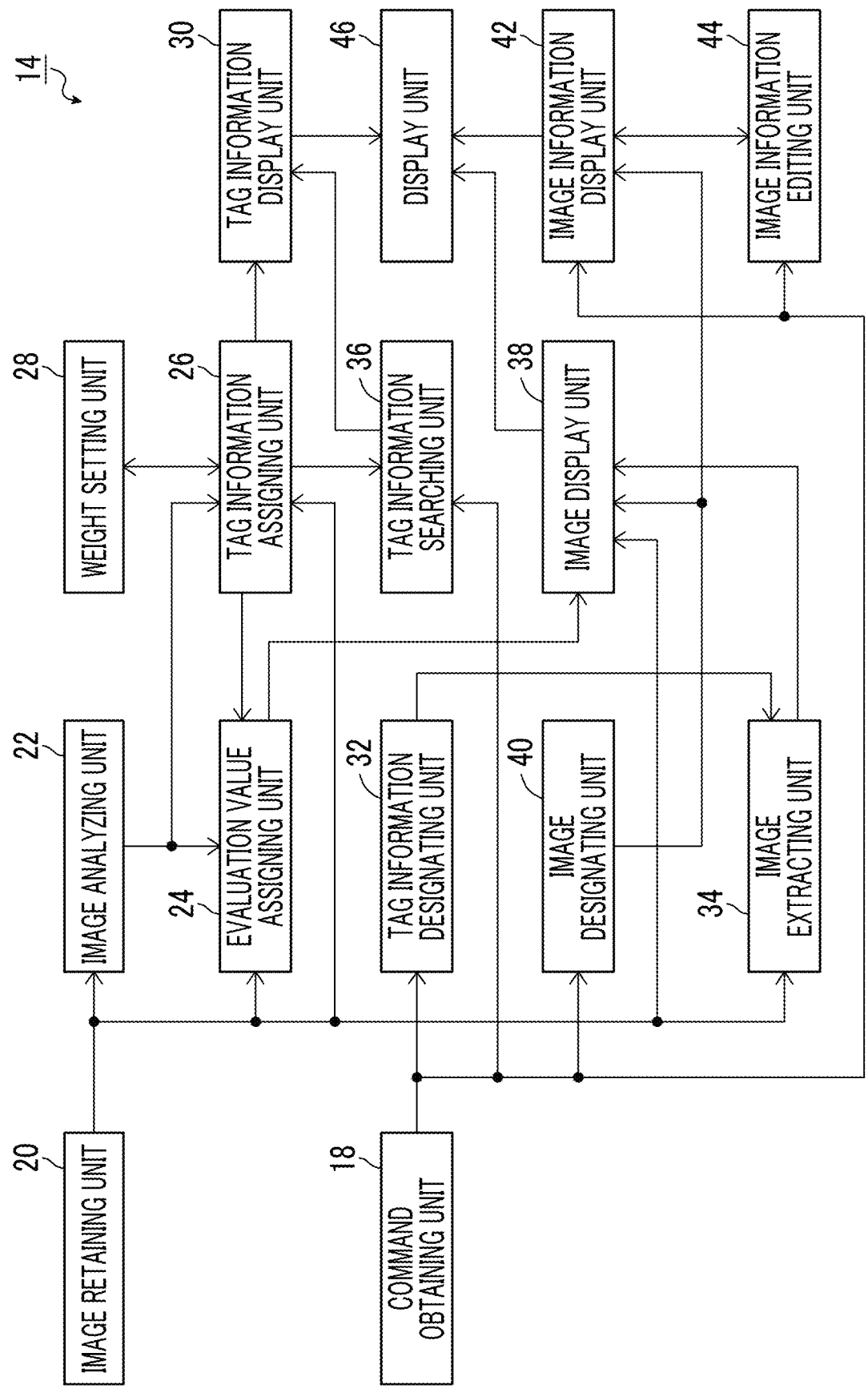
FIG. 2 is a block diagram of an embodiment showing a configuration of a client.

FIG. 2 is a block diagram of an embodiment showing a configuration of the client. The client 14 shown in FIG. 2 comprises a command obtaining unit 18, an image retaining unit 20, an image analyzing unit 22, an evaluation value assigning unit 24, a tag information assigning unit 26, a weight setting unit 28, a tag information display unit 30, a tag information designating unit 32, an image extracting unit 34, a tag information searching unit 36, an image display unit 38, an image designating unit 40, an image information display unit 42, an image information editing unit 44, and a display unit 46.

In the client 14, the command obtaining unit 18 initially obtains a command input from the user of the client 14.

The user can input various commands by touching a touch panel of the smartphone. The touching target is not limited to the touch panel, and the command can be input by using an input device such as a mouse, a keyboard, and a trackpad.

Although the details will be described below, the command from the user includes a command to select the tag information, a command to select the image, a command to input the tag information to be assigned to the image, a command to input a searching condition (keyword) of the tag information, and a command to display the image on the display unit 46.

Subsequently, the image retaining unit 20 is a storage device such as a semiconductor memory, and retains the image group.

The image group is captured by the user by using a camera of the smartphone, and is retained in the smartphone. The image group is not particularly limited thereto, and may be an image group introduced into the smartphone from the outside, an image group online retained in a social network system (SNS) and an online storage, and a combination of these image groups.

For example, the image captured by the camera of the smartphone can be set so as to be automatically uploaded from the smartphone to the server 12. The image uploaded to the server 12 is retained in a storage region of each user within the storage device of the server 12. The image uploaded to the server 12 may be set so as to remain in the image retaining unit 20 of the smartphone, or may be set so as to be removed.

For example, an image captured by a digital camera, an image retained in a PC, a laptop PC, or a tablet PC, and an image (digital image data) scanned from a photo printer can be introduced into the smartphone. The image introduced into the smartphone from the outside is retained in the image retaining unit 20, and is similarly used as a part of the image group.

Subsequently, the image analyzing unit 22 analyzes each image included in the image group.

An analysis item of the image is not particularly limited, and includes, for example, analysis of an image content such as detection (person detection and object detection) for detecting a subject appearing in the image, detection of a face of the person, detection of facial expression of the person, detection of a behavior of the person, detection of a scene (night view, sea, sand, sky, . . . ), detection of an event (sports day, wedding ceremony, graduation ceremony, . . . ), detection of a preference (hobby) of the user, analysis of quality of the image such as brightness, hue, contrast, and a degree of blurriness of the image, and analysis of time information (imaging timing) and positional information (imaging location) included in additional information of the image such as exchangeable image file format (Exif).

Subsequently, the evaluation value assigning unit 24 assigns an evaluation value to each image based on the analyzing result of each image.

The method of assigning, by the evaluation value assigning unit 24, the evaluation value to the image is not particularly limited. For example, a score may be assigned to an analyzing result of each image, a total score of the scores of the plurality of analyzing results may be calculated, and the total score may be assigned as the evaluation value of the image.

For example, a higher score is assigned to an image on which the person is smiling than scores assigned to images on which the person is crying and is angry. A higher score is assigned to an image of which brightness is appropriate than scores assigned to a too bright image and a too dark image.

The evaluation value assigning unit 24 sets an evaluation value of an image to which tag information selected later is assigned to be higher than an evaluation value of an image to which tag information selected earlier in time is assigned depending on the setting of a weight of the tag information to be described below.

Subsequently, the tag information assigning unit 26 assigns the tag information to each image based on the analyzing result of each image.

The tag information includes various information items regarding the image, and includes, for example, an imaging date and an imaging location of the image, a name of a subject appearing in the image, a name of a behavior of the subject, a scene and an event read from the image, a name expressing the emotion of the person, and a name of the preference of the user. The tag information is text information, and the tag information can be searched for by a keyword.

The tag information may include tag information of a higher concept including a plurality of tag information of lower concepts. For example, the tag information may include tag information of a higher concept of "sweets" including two tag information of the lower concepts of "Mont Blanc" and "strawberry shortcake".

The tag information may include reliability information indicating the reliability of the tag information. The content of the automatically assigned tag information may not be accurate, but it is possible to determine the accuracy of the content of the tag information based on the reliability information.

The tag information assigning unit 26 is not an essential component, but may further assign the tag information to the tag information assigned to the image in advance, or may newly assign tag information to the image to which the tag information is not assigned.

Subsequently, the weight setting unit 28 sets the weight to the tag information.

The method of setting, by the weight setting unit 28, the weight to the tag information is not particularly limited, but in a case where the user searches for the image by using two or more tag information, it is considered that the tag information selected later is likely to be more important than the tag information selected earlier in time. Accordingly, the weight setting unit 28 can set the weights such that the weight of the tag information selected later, of two or more tag information simultaneously selected from the tag information displayed on the display unit 46 according to the command from the user, is larger than the weight of the tag information selected earlier in time.

Subsequently, the tag information display unit 30 displays the tag information assigned to the image included in the image group on the display unit 46.

The method of displaying, by the tag information display unit 30, the tag information is not particularly limited. For example, the tag information displayed on the display unit 46 can be displayed while being classified into a plurality of categories. Accordingly, since the tag information can be displayed while being classified for each kind of the tag information, the user can easily find the tag information desired to be used as the image searching condition from the tag information displayed on the display unit 46.

In this case, the tag information display unit 30 can display the tag information included in at least one of the plurality of categories in descending order of the number of images to which the tag information is assigned. Accordingly, it is possible to preferentially display the tag information assigned to many images. The tag information represented by consecutive numbers such as the imaging date of the image may be displayed in descending or ascending order of the numbers.

The tag information display unit 30 may display the tag information included in at least one of the plurality of categories in descending order of the number of times the tag information is used as the keyword for searching for the image, or may display the tag information included in at least one of the plurality of categories in descending order of reliability of the tag information based on the reliability information of the tag information in a case where the tag information has the reliability information.

In a case where the tag information of the higher concept is selected according to the command from the user, the tag information display unit 30 can display the plurality of tag information of the lower concepts included in the tag information of the higher concept on the display unit 46.

The tag information display unit 30 can display the tag information as a button (link) on the display unit (touch panel) 46. Accordingly, the user can easily select the tag information.

Subsequently, the tag information designating unit 32 designates, as selection tag information, the tag information selected from the tag information displayed on the display unit 46 according to the command from the user.

The tag information designating unit 32 designates, as the selection tag information, search tag information selected from the search tag information displayed on the display unit 46 according to the command from the user.

Subsequently, the image extracting unit 34 extracts, as a search image, an image to which the selection tag information designated by the tag information designating unit 32 is assigned from the image group.

Here, the tag information display unit 30, the tag information designating unit 32, and the image extracting unit 34 constitute an image searching unit of the present invention that searches for an image matching the searching condition input according to the command from the user from the image group, as the search image.

Subsequently, the tag information searching unit 36 searches for, as search tag information, tag information of which at least a part matches the keyword input according to the command from the user from all the tag information assigned to all the images included in the image group.

Subsequently, the image display unit 38 displays the image included in the image group on the display unit 46.

For example, the image display unit 38 displays each image included in the image group, a list (thumbnail images)

of the images included in the image group, and a list (thumbnail images) of the search images.

In a case where the list of the images or the list of the search images is displayed on the display unit 46, the image display unit 38 can display the images in a sequence of time in order of imaging timings. In a case where each image included in the image group has information of the evaluation value of the image, the image display unit 38 can display the images on the display unit 46 in descending order of the evaluation value of the image.

Subsequently, the image designating unit 40 designates one image selected from the images displayed on the display unit 46 according to the command from the user.

The user can select one image desired to be browsed from the list of the images displayed on the display unit 46. In a case where one image is selected, only one selected image is displayed on the display unit 46 by the image display unit 38.

Subsequently, the image information display unit 42 displays one image designated by the image designating unit 40, that is, information of one image selected according to the command from the user on the display unit 46.

The information of the image includes various information items regarding the image. In the present embodiment, the information of the image includes the imaging timing of the image and the tag information assigned to the image. The present invention is not limited thereto, and the information of the image may include a file name of the image, a size and a resolution of the image, and information of the imaging location.

Subsequently, the image information editing unit 44 edits the information of one image displayed on the display unit 46 by the image information display unit 42 according to the command from the user.

The user can edit the tag information assigned to the image. Inaccurate tag information may be included in the tag information automatically assigned by the tag information assigning unit 26. The user can correct or delete the tag information considered to be inaccurate.

The user can assign new tag information to the image. In this case, the image information editing unit 44 assigns new tag information input according to the command from the user to one image as the information of one image displayed on the display unit 46.

Subsequently, the display unit 46 displays various information items.

The image, the information of the image, the list of the images, and the list of the tag information are displayed on the display unit 46. The display unit 46 is a liquid crystal panel or an organic electroluminescence (EL) panel, and is the touch panel in the present embodiment.

Figure 3:
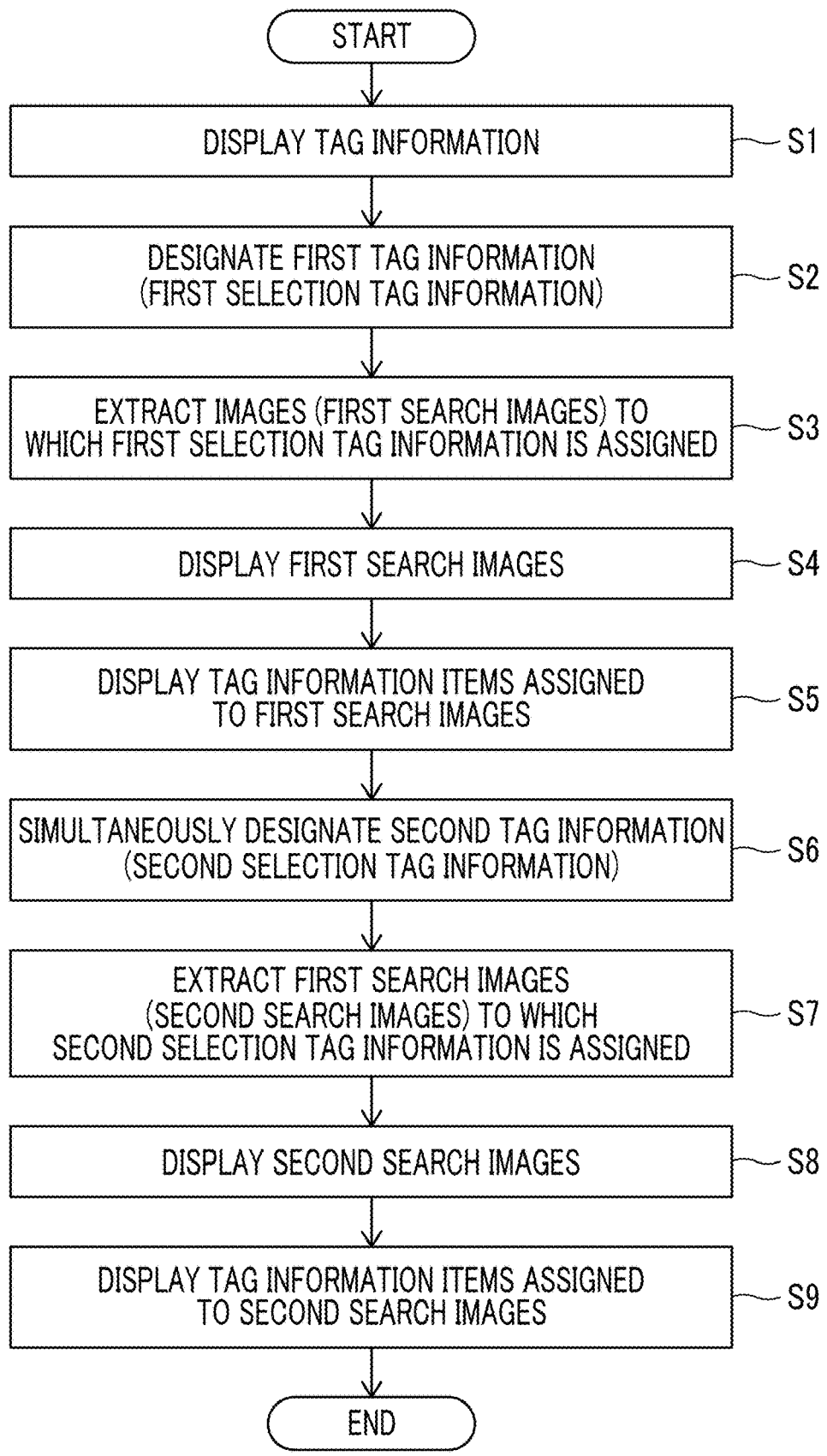
FIG. 3 is a flowchart of an embodiment representing an operation of the client.

Next, an operation in a case where a desired image is searched for from the image group by using the tag information assigned to the image as the searching condition in the client 14 while referring to the flowchart shown in FIG. 3 will be described.

Initially, an operation in a case where first tag information is selected will be described.

In this case, at least a part of all the tag information assigned to all the images included in the image group is initially displayed on the display unit 46 by the tag information display unit 30 (step S1).

Subsequently, in a case where the tag information is displayed on the display unit 46, first tag information selected from the tag information displayed on the display unit 46 according to the command from the user is designated as first selection tag information (selection tag information) by the tag information designating unit 32 (step S2).

Subsequently, in a case where the first selection tag information is designated, images to which the first selection tag information is assigned are extracted as first search images (search images) from the image group by the image extracting unit 34 (step S3).

Subsequently, in a case where the first search images are extracted, at least a part of all the first search images is displayed on the display unit 46 by the image display unit 38 (step S4).

Subsequently, at least a part of all the tag information assigned to all the first search images is displayed on the display unit 46 by the tag information display unit 30 (step S5).

Next, an operation in a case where second tag information is simultaneously selected in addition to the first tag information will be described.

In this case, second tag information selected from the tag information displayed on the display unit 46 according to the command from the user is simultaneously designated as second selection tag information (selection tag information) in addition to the first selection tag information by the tag information designating unit 32 (step S6).

Subsequently, the first search images to which the second selection tag information is assigned are extracted as second search images (search images) from the first search images by the image extracting unit 34 (step S7).

Subsequently, at least a part of all the second search images is displayed on the display unit 46 by the image display unit 38 (step S8).

Subsequently, at least a part of all the tag information assigned to all the second search images is displayed on the display unit 46 by the tag information display unit 30 (step S9).

The same is true of an operation in a case where three or more tag information are simultaneously selected. That is, an operation in a case where two or more tag information are simultaneously selected is as follows.

Initially, two or more tag information selected from the tag information displayed on the display unit 46 according to the command from the user are simultaneously designated as the selection tag information by the tag information designating unit 32.

Subsequently, images to which all two or more selection tag information are assigned are extracted as search images from the image group by the image extracting unit 34.

Subsequently, at least a part of all the search images is displayed on the display unit 46 by the image display unit 38.

Subsequently, at least a part of all the tag information assigned to all the search images is displayed on the display unit 46 by the tag information display unit 30.

Hereinafter, an example in which the client 14 is realized by an application program (hereinafter, simply referred to as an application) operating on the smartphone will be described in the image processing device according to the embodiment of the present invention.

Figure 4:
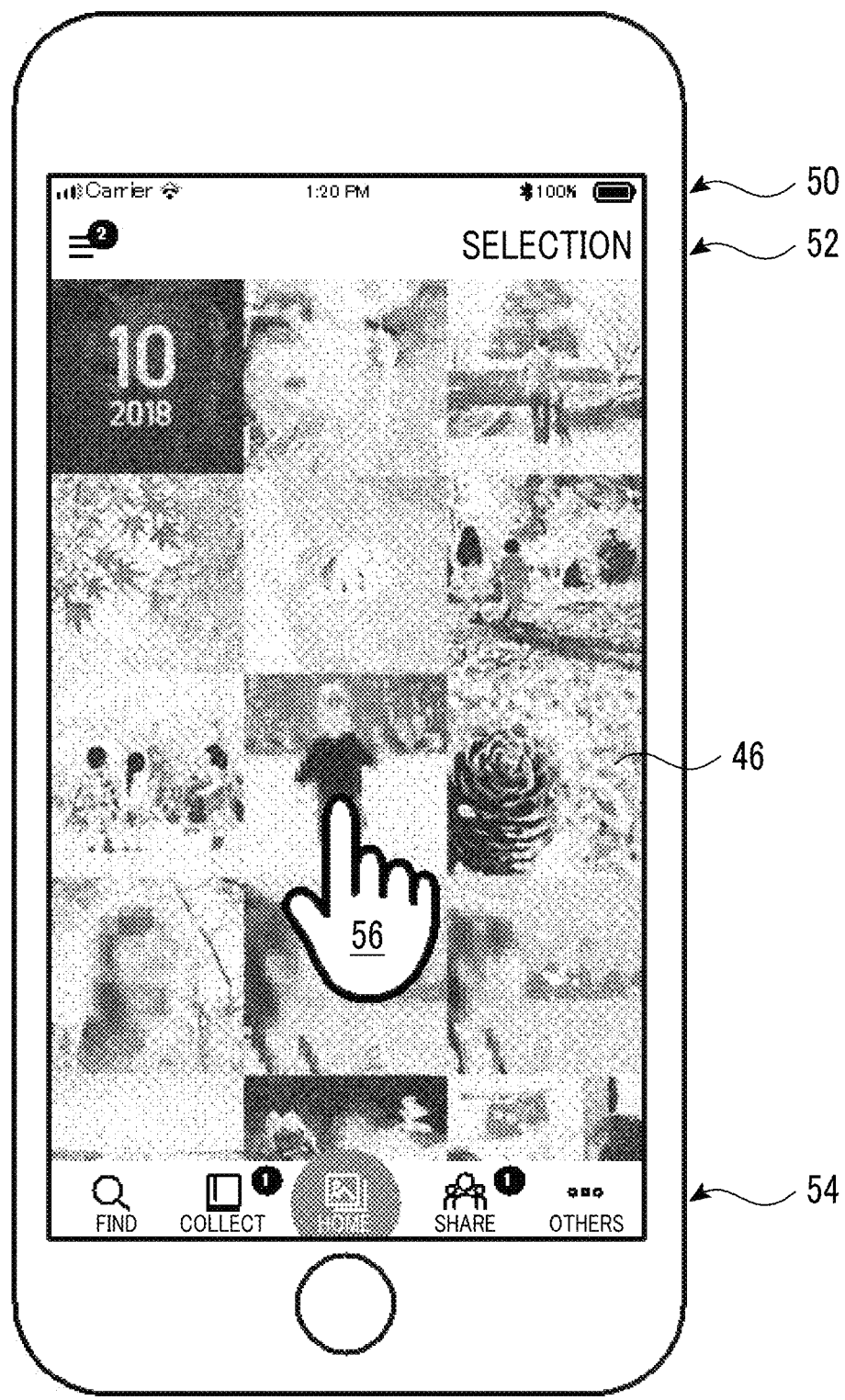
FIG. 4 is a conceptual diagram of an embodiment representing a home screen of an application displayed on a display unit of the client.

FIG. 4 is a conceptual diagram of an embodiment representing a home screen of the application displayed on the display unit of the client. The display unit 46 of the smartphone shown in FIG. 4 is the touch panel, and the user can use the display unit (touch panel) 46 as the command obtaining unit 18 that obtains various commands input from the user in addition to displaying various information items by touching the touch panel.

A notification and a status region 50 is displayed at an upper portion within the home screen, and a menu region 52 is displayed on a lower side thereof. A navigation region 54 is displayed at a lower portion within the home screen.

Buttons of "find", "collect", "home", "share", and "others" are displayed in order from a left side to a right side within the navigation region 54.

In a case where the button of "find" is tapped (pressed), a selection screen of the tag information is displayed on the display unit 46.

In a case where the button of "collect" is tapped, a combination image of a photo album is automatically created by using the images included in the image group.

In a case where the button of "home" is tapped, the home screen, that is, the list of the images included in the image group is displayed on the display unit 46. On the list of the images, the images are displayed in order of, for example, the imaging timing (descending or ascending order).

In a case where the button of "share" is tapped, the image selected according to the command from the user is shared with another user.

In a case where the button of "others" is tapped, various other functions which are not displayed in the navigation region can be selected and executed.

The list of the images is displayed in a region between the menu region 52 and the navigation region 54. Before the image is searched, in a state in which any tag information is not selected as the searching condition, the list of the images, for example, at least a part of all the images included in the image group is displayed on a list screen of the image in a sequence of time in order of the imaging timing of the images, for example, in descending order of the imaging timing in the present embodiment from an upper side of the list screen of the image toward a lower side.

As represented by a finger stamp 56 in FIG. 4, the user taps one image desired to be browsed from the images displayed on the list screen of the image, and thus, the user can display and browse only the one tapped image on the display unit 46.

In this case, one image selected from the list of the images displayed on the display unit 46 according to the command from the user is designated as a designation image by the image designating unit 40, and only the designation image is displayed on the display unit 46 by the image display unit 38.

Figure 5:
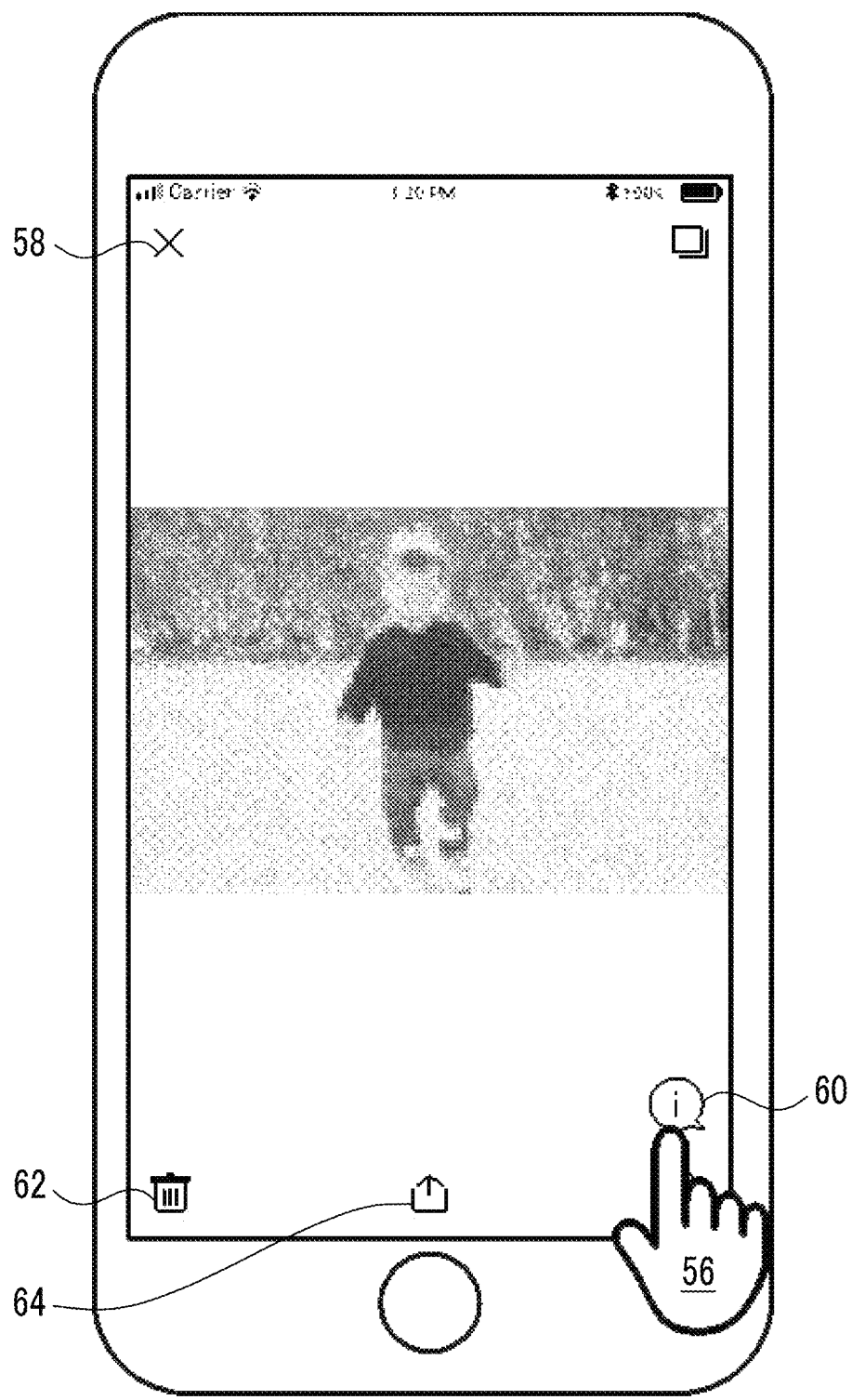
FIG. 5 is a conceptual diagram of an embodiment representing a browsing screen of a designation image.

FIG. 5 is a conceptual diagram of an embodiment representing a browsing screen of the designation image. The browsing screen of the designation image is displayed on the entire surface of the display unit 46. As shown in FIG. 5, a button 58 of "x" is displayed at an upper left portion of the browsing screen of the designation image, and a button 60 of "information" is displayed at a lower right portion. A button 62 of "trash can" and a button 64 of "share" are displayed at a lower portion of the browsing screen of the designation image.

For example, the user can close the browsing screen of the designation image and can return to the list screen (home screen) of the image by tapping the button 58 of "x". The user can delete the designation image by tapping the button 62 of "trash can" or can share the designation image with another user by tapping the button 64 of "share". As represented by the finger stamp 56 in FIG. 5, the user can turn over the designation image by tapping the button 60 of "information" and can browse the information of the designation image.

Figure 6:
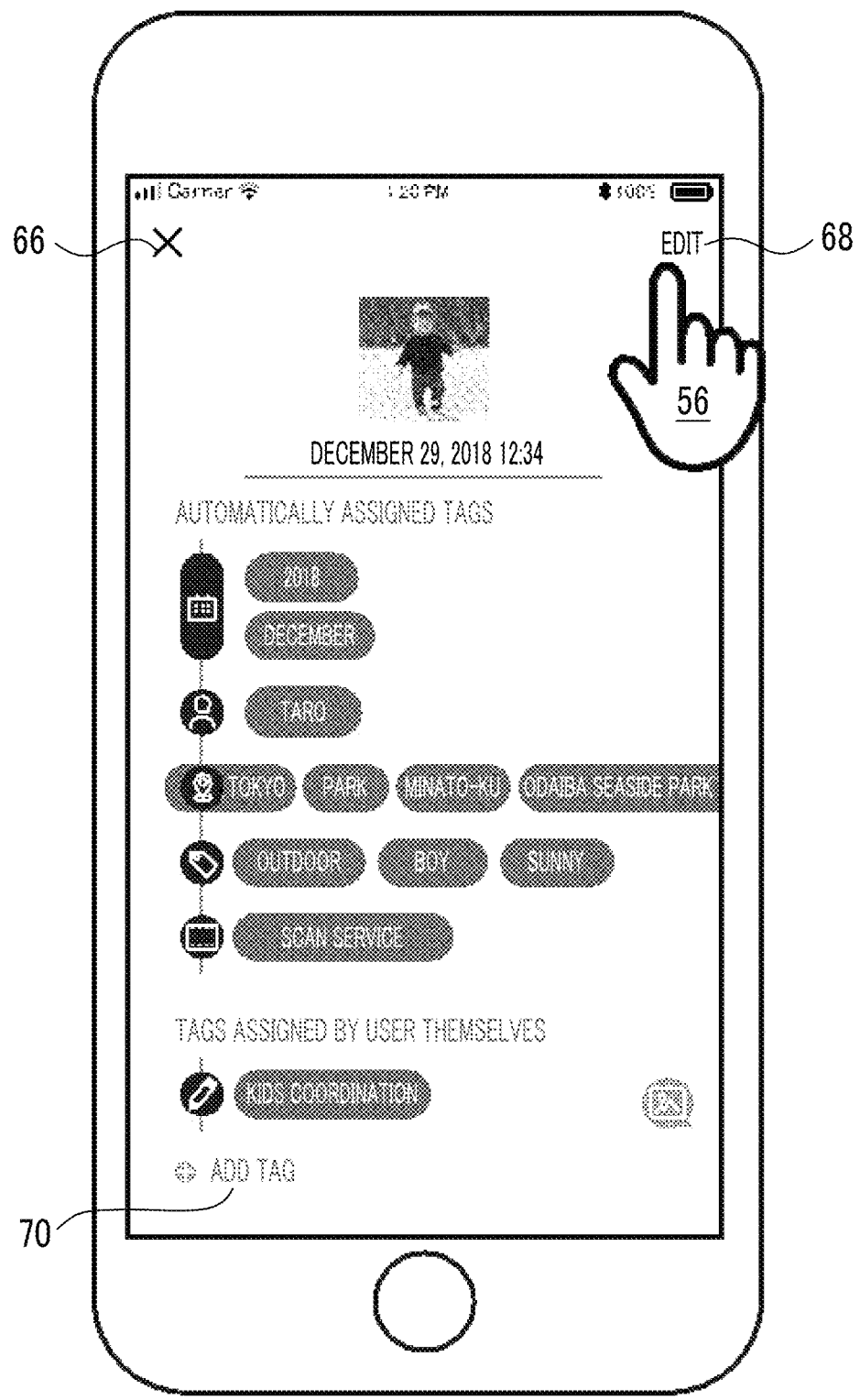
FIG. 6 is a conceptual diagram of an embodiment representing a browsing screen of information of the designation image.

FIG. 6 is a conceptual diagram of an embodiment representing a browsing screen of the information of the designation image. A button 66 of "x" is displayed at an upper left portion of the browsing screen of the information of the designation image, and a button 68 of "edit" is displayed at an upper right portion. A thumbnail image of the designation image is displayed at an upper portion of the browsing screen of the information of the designation image, and an imaging timing of the designation image, automatically assigned tags, tags assigned by the user, and a button 70 of "add tag" are displayed on a lower side thereof in this order.

The automatically assigned tags are classified into categories of a calendar, a person, an imaging location, an automatic assignment tag, and a service tag, and the tags assigned by the user are classified into a category of a manual assignment tag.

Buttons of tag information of "2018" and "December" as an imaging year and an imaging month of the designation image are included in the category of the calendar.

A button of tag information of "Taro" is included in the category of the person.

Buttons of tag information of "park", "Minato-ku", and "Odaiba Seaside Park" are included in the category of the imaging location.

Buttons of tag information of "outdoor", "boy", and "sunny" are included in the category of the automatic assignment tag.

A button of tag information of "scan service" is included in a category of a scan tag.

A button of tag information of "kids coordination" is included in the category of the manual assignment tag.

For example, the user can close the browsing screen of the information of the designation image by tapping the button 66 of "x", and can return to the browsing screen of the designation image. As represented by the finger stamp 56, the user can edit the information of the designation image by tapping the button 68 of "edit".

Figure 7:
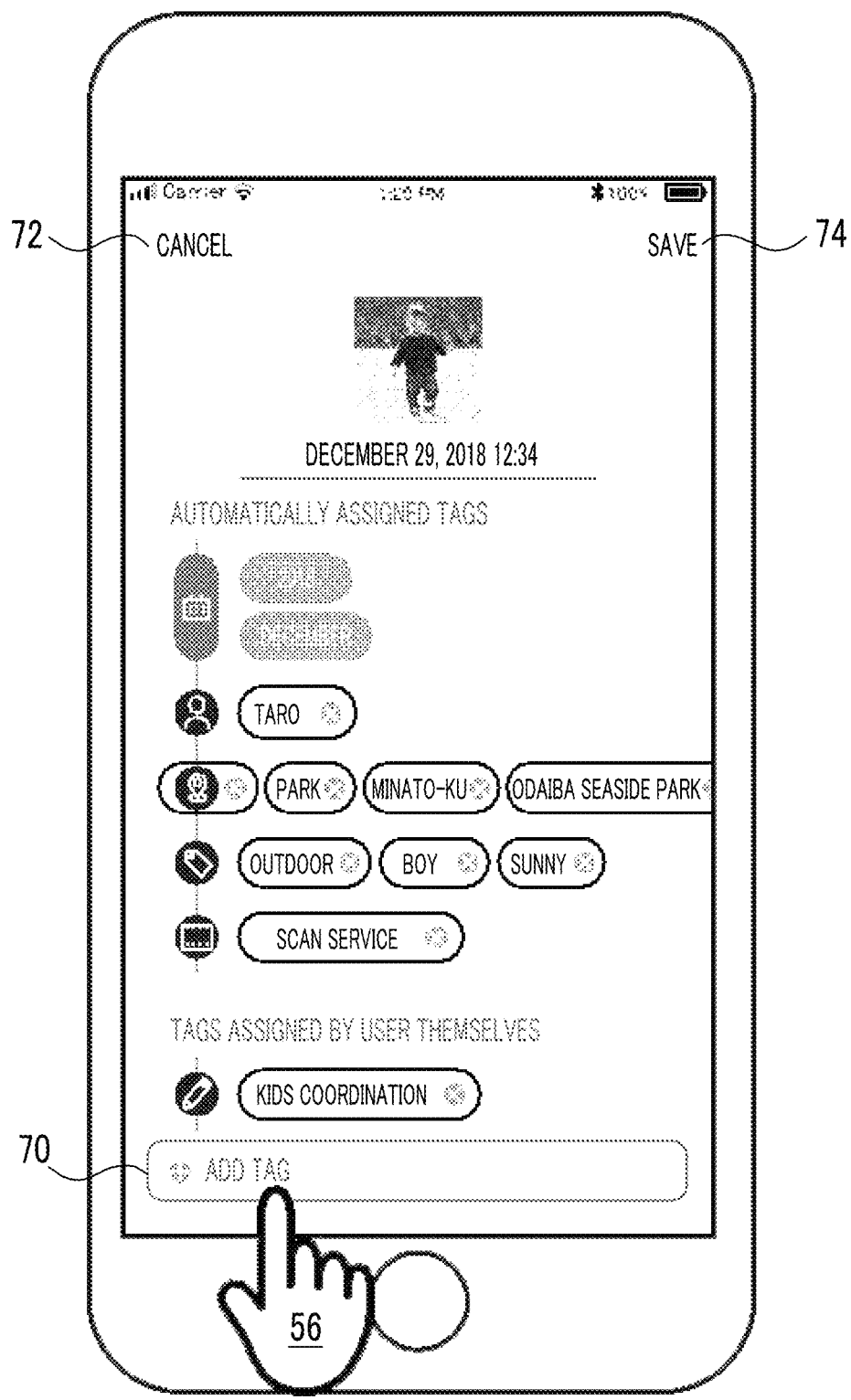
FIG. 7 is a conceptual diagram of an embodiment representing an editing screen of the information of the designation image.

FIG. 7 is a conceptual diagram of an embodiment representing an editing screen of the information of the designation image. A button 72 of "cancel" is displayed at an upper left portion of the editing screen of the information of the designation image shown in FIG. 7, and a button 74 of "save" is displayed at an upper right portion.

In a case where the button 68 of "edit" is tapped on the browsing screen of the information of the designation image, the button of "x" is displayed within a button of deletable tag information on the editing screen of the information of the designation image. In a case where the button of "x" within the button of the tag information is tapped by the user, the button of the tag information is deleted by the image information editing unit 44. As represented by the finger stamp 56 in FIG. 7, in a case where the button 70 of "add tag" is tapped by the user, an input screen of new tag information is displayed.

In a case where the button 72 of "cancel" is tapped on the editing screen of the information of the designation image, an editing content for the information of the designation image is discarded, and the editing screen is returned to the browsing screen of the information of the designation image. In a case where the button 74 of "save" is tapped, the editing content for the information of the designation image is saved.

Figure 8:
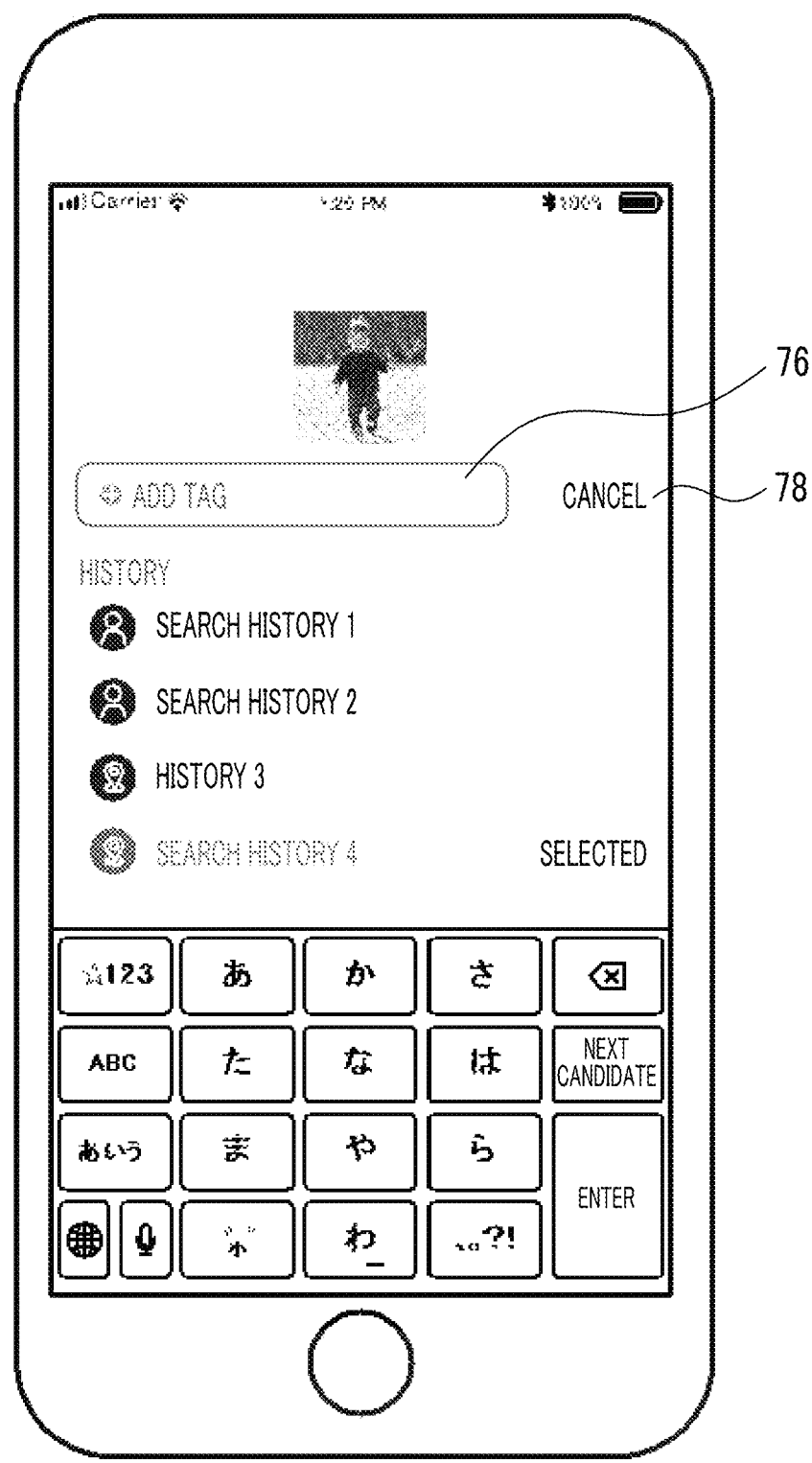
FIG. 8 is a conceptual diagram of an embodiment representing an input screen of new tag information.

FIG. 8 is a conceptual diagram of an embodiment representing the input screen of new tag information. The thumbnail image of the designation image is displayed at an upper portion of the input screen of the new tag information shown in FIG. 8, and an input field 76 of the new tag information is displayed on a lower side thereof. A message of "add tag" for prompting the user to input the new tag information is displayed in the input field 76 of the new tag information. A button 78 of "cancel" is displayed on a right side of the input field 76 of the new tag information.

In a case where the input field 76 of the new tag information is tapped by the user, a history of the new tag information recently assigned is displayed on a lower side of the input field 76 of the new tag information, and a software keyboard is displayed at a lower portion of the input screen of the new tag information. The user can input a name of the new tag information in the input field 76 of the new tag information by using the software keyboard.

In this case, whenever the user inputs a character in the input field 76 of the new tag information, tag information partially matching the character input in the input field 76 of the new tag information is searched for from all the tag information assigned to all the images included in the image group by performing partial match searching, and is displayed on the input screen of the new tag information. The user can select the new tag information from the list of the tag information displayed within the input screen of the new tag information.

In a case where the button 78 of "cancel" is tapped by the user, the input screen of the new tag information is closed, and the input screen is returned to the editing screen of the information of the designation image.

Next, the selection screen of the tag information will be described.

As stated above, in a case where the button of "find" is tapped, the selection screen of the tag information is displayed on the display unit 46.

Figure 9:
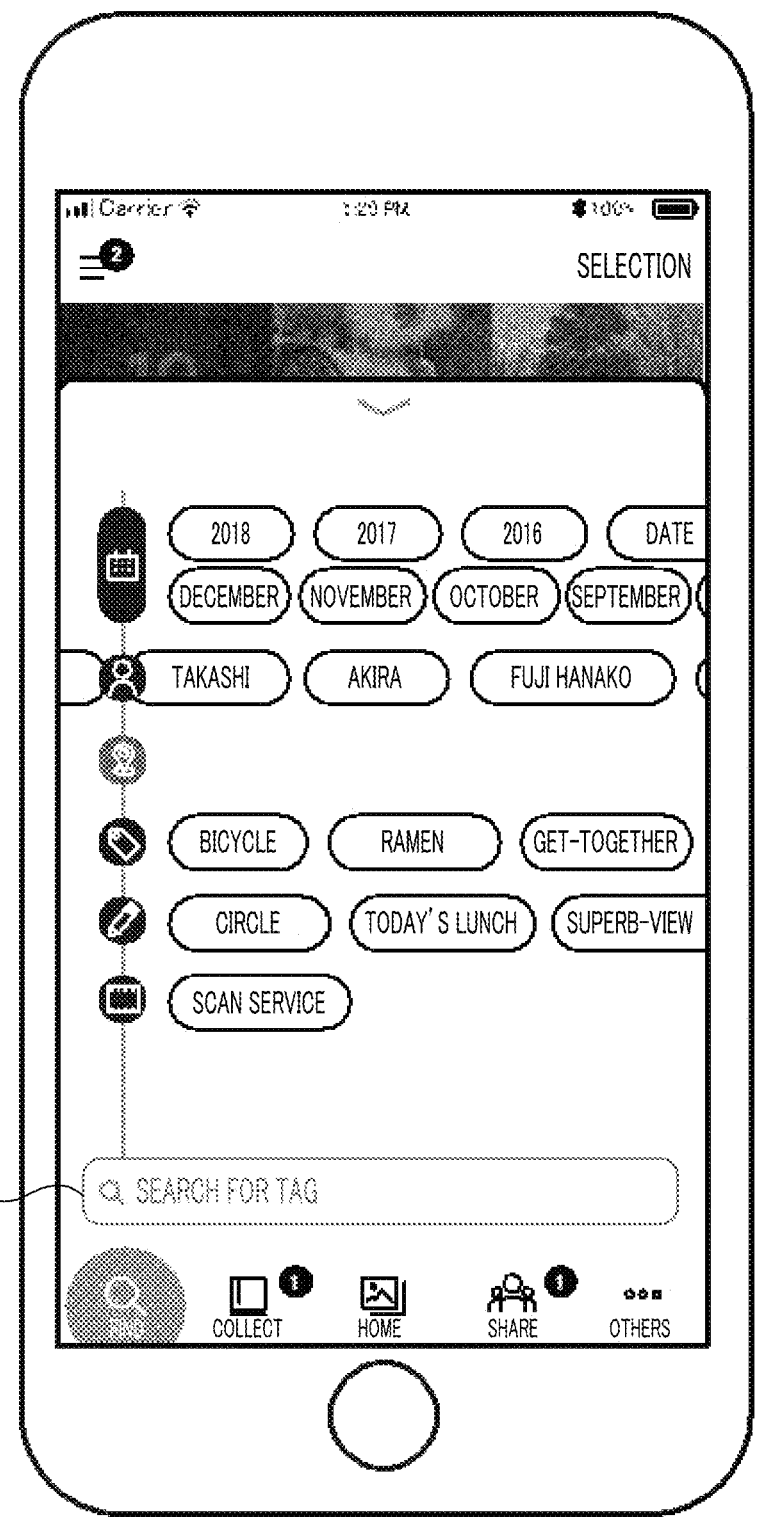
FIG. 9 is a conceptual diagram of an embodiment representing a selection screen of tag information.

FIG. 9 is a conceptual diagram of an embodiment representing the selection screen of the tag information. The selection screen of the tag information is displayed such that a list of images in a lower layer is superimposed on an upper layer of a region other than a partial region on the upper side of the list screen of the image so as to be transparent at a predetermined transmittance. In a state in which the tag information is not selected, a part of all the tag information assigned to all the images included in the image group is classified into a plurality of categories and is displayed on the selection screen of the tag information. Each tag information is displayed as the button within the selection screen of the tag information. A button 80 of "search for tag" is displayed at a lower portion within the selection screen of the tag information.

The categories of the calendar, the person, the imaging location, the automatic assignment tag, the manual assignment tag, and the service tag are included in the plurality of categories.

The buttons of the tag information of the imaging year and the imaging month of the image are included in the category of the calendar.

The button of the tag information of the name of the person appearing in the image is included in the category of the person.

The button of the tag information of the location at which the image is captured is included in the category of the imaging location.

The button of the tag information automatically assigned by the tag information assigning unit 26 is included in the category of the automatic assignment tag.

The button of the tag information manually assigned by the user, that is, the button of the tag information assigned by the image information editing unit 44 is included in the category of the manual assignment tag.

For example, buttons of tag information related to services provided by the image processing system 10 according to the embodiment of the present invention such as a case where a printout is scanned and digital image data is created are included in the category of the service tag.

On the selection screen of the tag information, in the category of the calendar, the buttons of the tag information of "2018", "2017", and "2016" as the imaging year of the image are displayed in this order from a left side to a right side, and the buttons of the tag information of "December", "November", "October", and "September" as the imaging month of the image are displayed in this order from the left side to the right side.

In the category of the person, buttons of tag information of "Takashi", "Akira", and "Hanako Fuji" as the name of the person are displayed in this order from the left side to the right side.

The tag information is not included in the category of the imaging location.

In the category of the automatic assignment tag, buttons of tag information of "bicycle", "ramen", and "get-together" are displayed in this order from the left side to the right side.

In the category of the manual assignment tag, buttons of tag information of "circle", "today's lunch", and "superb view" are displayed in this order from the left side to the right side.

In the category of the service tag, a button of tag information of "scan image" is displayed.

The buttons of the tag information included in each other category other than the category of the calendar are displayed in a row. In the category of the calendar, the buttons of the tag information of the imaging year and the imaging month of the image are displayed in a row in descending order of the numbers of the imaging year and the imaging month. The buttons of the tag information included in each other category are displayed in descending order of the number of images to which each tag information is assigned.

In a case where too many tag information to be displayed in a left-right direction are included in each category, the user can push the button of the tag information displayed on the selection screen of the tag information to the outside by swiping the button in a left direction or a right direction while tapping the button of the tag information included in each category, and can display the button of the tag information which is not displayed on the selection screen of the tag information by moving the button into the selection screen of the tag information.

The user does not need to input the keyword by typing the keyword in order to search for the image. Since the user can select by tapping the tag information corresponding to a desired image desired to be searched for from the tag information displayed on the display unit 46, the user can intuitively search for the image.

Figure 10:
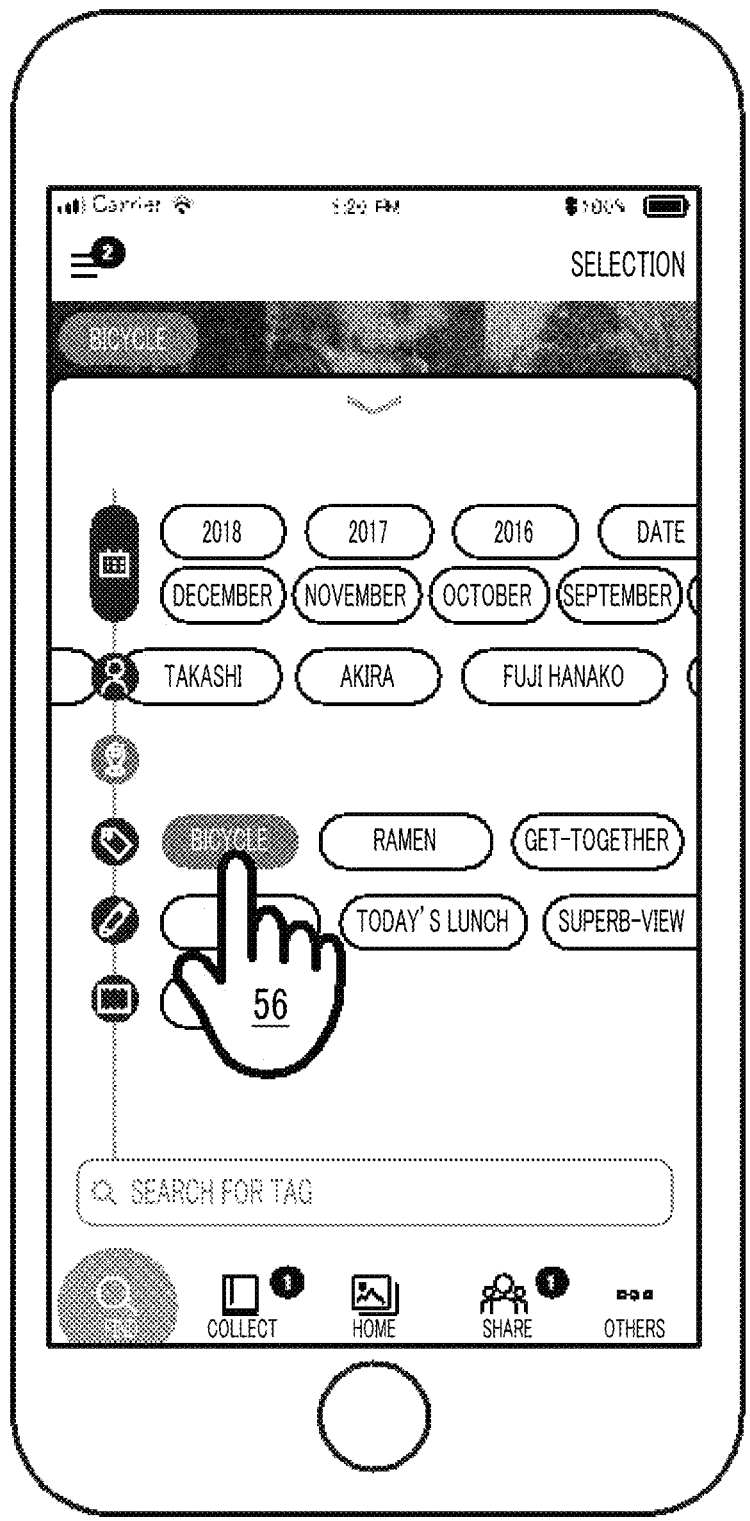
FIG. 10 is a conceptual diagram of an embodiment representing a scene in which first tag information is selected on the selection screen of the tag information.

Here, in a state in which any tag information as the searching condition is not selected by the user, it is assumed that the button of the tag information of "bicycle" is tapped as the first tag information among the buttons of the tag information displayed on the selection screen of the tag information as represented by the finger stamp 56 in FIG. 10.

In this case, the tag information of "bicycle" corresponding to the button of the tag information of "bicycle" selected according to the command from the user is designated as the first selection tag information by the tag information designating unit 32. A color of the button of the tag information of "bicycle" is changed and this button is displayed as "bicycle" on a left side within a region at an upper portion of the list screen of the image which is not covered by the selection screen of the tag information by the tag information display unit 30.

Subsequently, an image to which the tag information of "bicycle" which is the first selection tag information is assigned is extracted as first search images from the image group by the image extracting unit 34, and at least a part of all the first search images is displayed on the list screen of the image by the image display unit 38.

Figure 11:
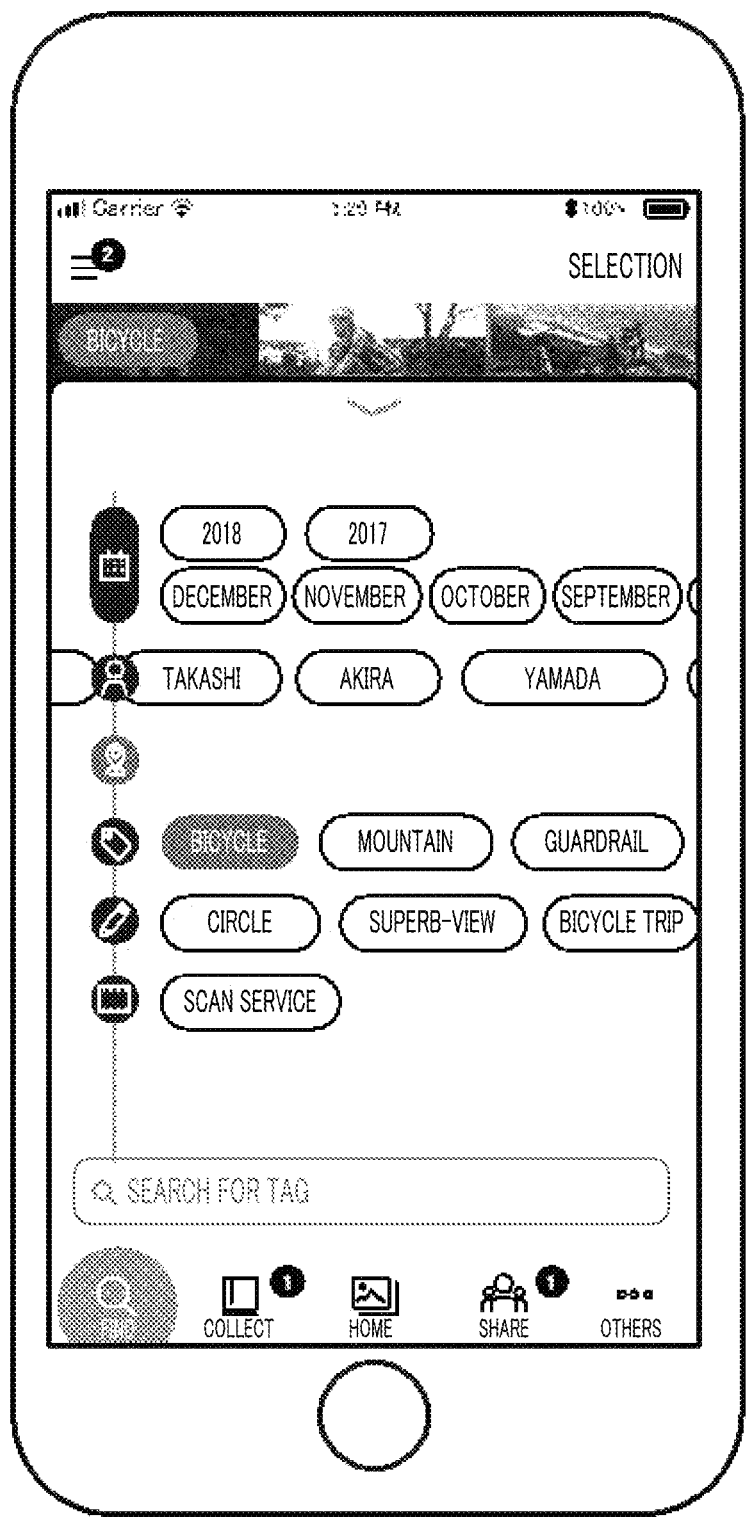
FIG. 11 is a conceptual diagram of an embodiment representing a scene in which contents of the tag information are updated so as to correspond to the first tag information on the selection screen of the tag information.

As shown in FIG. 11, at least a part of all the tag information assigned to all the first search images is displayed on the selection screen of the tag information by the tag information display unit 30. That is, the content of the tag information displayed on the selection screen of the tag information is updated.

In the present embodiment, the category of the calendar is changed from the buttons of the tag information of "2018", "2017", and "2016" to the buttons of the tag information of "2018" and "2017" as the imaging years of the images.

The category of the person is changed from the buttons of the tag information of "Takashi", "Akira", and "Fuji Hanako" to the buttons of the tag information of "Takashi", "Akira", and "Yamada".

The category of the automatic assignment tag is changed from the buttons of the tag information of "bicycle", "ramen", and "get-together" to the buttons of the tag information of "bicycle", "mountain", and "guardrail".

The category of the manual assignment tag is changed from the buttons of the tag information of "circle", "today's lunch", and "superb-view" to the buttons of the tag information of "circle", "superb-view", and "bicycle trip".

That is, in a case where only the button of the tag information of "bicycle" is selected from the buttons of the tag information displayed on the selection screen of the tag information, the images of the image group are narrowed to only the search images to which the tag information of "bicycle" is assigned, and all the tag information assigned to all the images included in the image group are narrowed to only all the tag information assigned to all the search images to which the tag information of "bicycle" is assigned.

Figure 12:
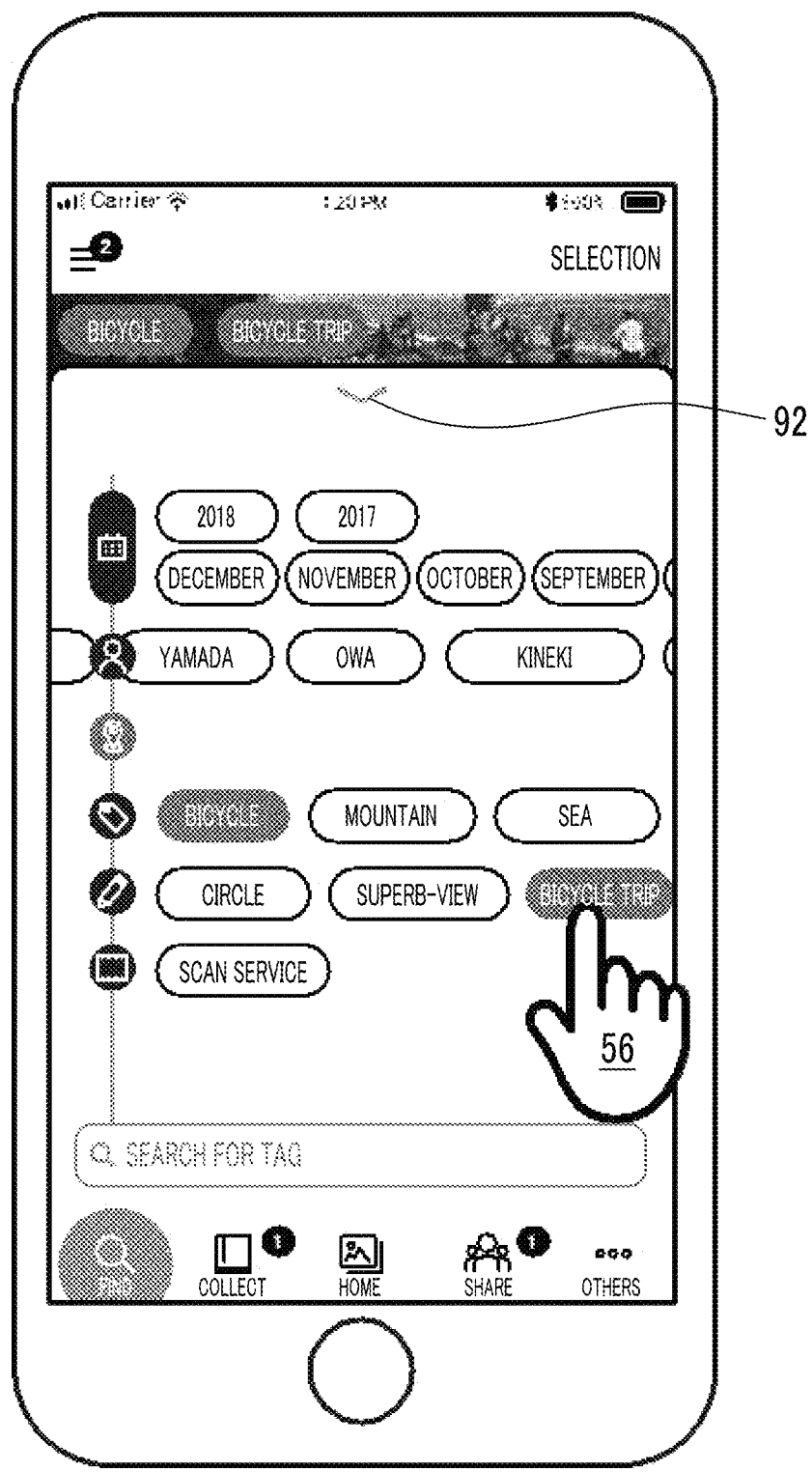
FIG. 12 is a conceptual diagram of an embodiment representing a scene in which second tag information is selected on the selection screen of the tag information.

Subsequently, it is assumed that the button of the tag information of "bicycle trip" is tapped as the second tag information among the buttons of the tag information displayed on the selection screen of the tag information in addition to the button of the tag information of "bicycle" as the first tag information by the user, as represented by the finger stamp 56 in FIG. 12. That is, it is assumed that two tag information are simultaneously selected by additionally selecting the button of the tag information of "bicycle trip" in a state in which the button of the tag information of "bicycle" is selected.

In this case, the tag information of "bicycle trip" as the second tag information corresponding to the button of the tag information of "bicycle trip" selected according to the command from the user is designated as the second selection tag information in addition to the tag information of "bicycle" as the first tag information by the tag information designating unit 32. That is, both the tag information of "bicycle" and "bicycle trip" are simultaneously designated as the selection tag information. A color of the button of the tag information of "bicycle trip" is changed in addition to the button of the tag information of "bicycle" and this button is displayed as "bicycle trip" on a right side of "bicycle" displayed within a region at an upper portion of the list screen of the image which is not covered by the selection screen of the tag information by the tag information display unit 30.

Figure 13:
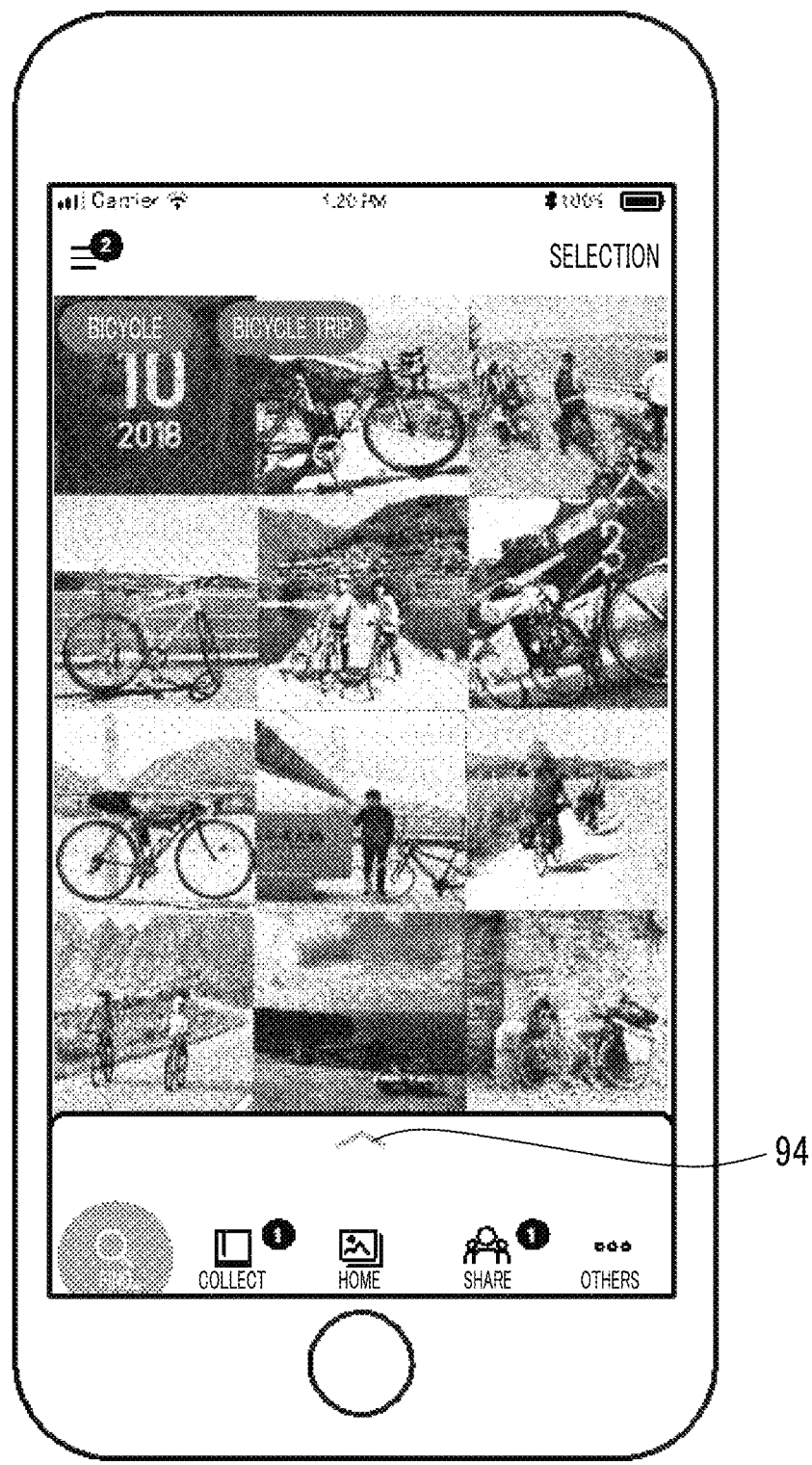
FIG. 13 is a conceptual diagram of an embodiment representing a list screen of images.

Subsequently, the first search images to which the tag information of "bicycle trip" is assigned are extracted as the second search image from the first search images to which the tag information of "bicycle" is assigned by the image extracting unit 34, and at least a part of the second search images is displayed on the list screen of the image by the image display unit 38 as shown in FIG. 13.

Although not shown, at least a part of all the tag information assigned to all the second search images is displayed on the selection screen of the tag information by the tag information display unit 30.

That is, in a case where the buttons of both the tag information of "bicycle" and "bicycle trip" are simultaneously selected, the images of the image group are narrow to only the search images to which both the tag information of "bicycle" and "bicycle trip" are assigned, and all the tag information assigned to all the images included in the image group are narrowed to only all the tag information assigned to all the search images to which both the tag information of "bicycle" and "bicycle trip" are assigned.

The user can close the selection screen of the tag information anytime by swiping a downward arrow 92 displayed at the upper portion of the selection screen of the tag information. In a case where the selection screen of the tag information is closed, the list screen of the image in the region covered by the selection screen of the tag information is displayed as shown in FIG. 13. Accordingly, the user can browse the list of the search images.

In a case where too many search images to be displayed are included on the list screen of the image, the user can push a part of the search images displayed on the list screen of the image to the outside by swiping the search image displayed on the list screen of the image in the up-down direction and moving the search image in an up-down direction, and can display a part of the search images which are not displayed on the list screen of the image by moving the part of the search images into the list screen of the image.

In a case where the selection screen of the tag information is closed, an upward arrow 94 is displayed at an lower portion of the selection screen of the tag information as shown in FIG. 13. The user can open the selection screen of the tag information anytime by swiping the upward arrow 94 in an up direction. In the present embodiment, the selection screen of the tag information can be switched between three stages of a fully opened state shown in FIGS. 9 to 12, a fully closed state shown in FIG. 13, and an intermediate position thereof. The selection screen of the tag information may be switched between multiple states of three stages or more.

The user can display the selection screen of the tag information anytime by tapping the button of "find" in a state in which the list screen of the image is displayed. Alternatively, the user can further narrow the images by additionally selecting the button of another tag information in a state in which two tag information of "bicycle" and "bicycle trip" are selected and further narrowing the tag information.

The designation of two tag information of "bicycle" and "bicycle trip" designated as the selection tag information is maintained until the designation as the selection tag information is released by the tag information designating unit 32 according to the command from the user.

For example, a button of "release" may be provided on the selection screen of the tag information. The user may release the selection of two tag information of "bicycle" and "bicycle trip" designated as the selection tag information at once by tapping the button of "release".

The user can switch between the selection and the release of the tag information as the selection tag information whenever the user taps the button of the tag information.

In this case, the designation of the tag information corresponding to the button as the selection tag information and the release of the designation of the tag information corresponding to the button as the selection tag information are switched by the tag information designating unit 32 whenever the button is pressed according to the command from the user.

In other words, since the selection of the tag information is maintained until the selection is released, in a state in which the selection of the tag information is maintained, that is, after the image is searched for by using the selected tag information, in a case where the screen is switched to another display screen and is switched to the selection screen of the tag information again, it is possible to browse the search image which is the result searched for by using the selected tag information anytime.

The user presses (long taps) the button of one tag information for a long time in a state in which the tag information is displayed on the display unit 46 as the button, and thus, the user can select the tag information of the higher concept corresponding to the tag information of one button pressed for a long time.

In this case, in a case where the button of one tag information selected from the buttons of the tag information displayed on the display unit 46 according to the command from the user is pressed for a predetermined time or more, all the tag information of the lower concepts included in the tag information of the higher concept of the tag information corresponding to pressed the button of one tag information are designated as the selection tag information by the tag information designating unit 32.

For example, in a case where the button of the tag information of "Mont Blanc" is pressed for a long time, all the tag information of "sweets" which are the higher concept of "Mont Blanc" are selected.

Alternatively, in a case where one tag information is selected from the tag information displayed on the display unit 46 according to the command from the user, the designation of another tag information already designated may be released, and only the selected one tag information may be designated as the selection tag information by the tag information designating unit 32.

Figure 14:
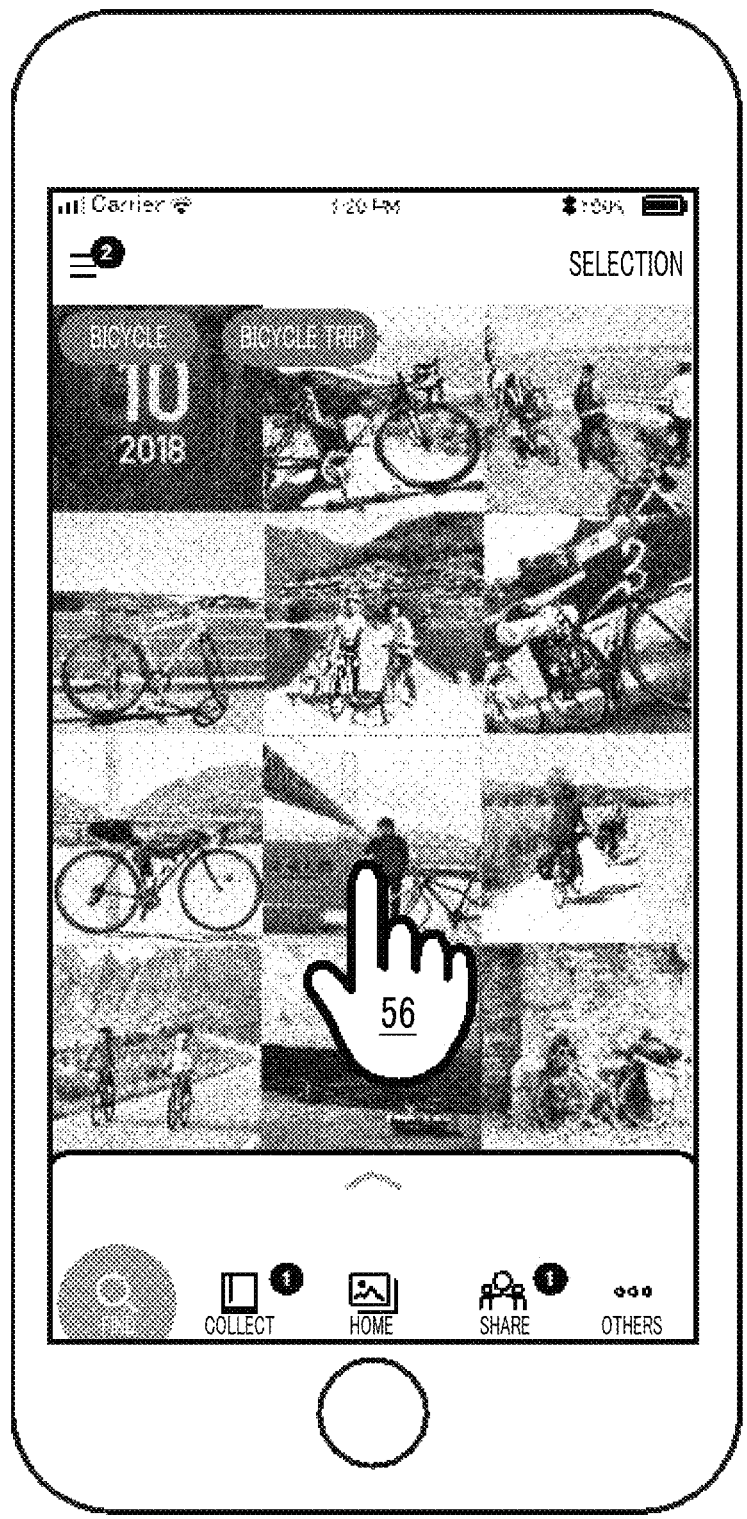
FIG. 14 is a conceptual diagram of an embodiment representing a scene in which one search image is selected on the list screen of the images.

Subsequently, as represented by the finger stamp 56 in FIG. 14, the user taps one search image desired to be browsed among the search images displayed on the list screen of the image, and thus, the user can display and browse only one tapped search image on the display unit 46.

In this case, one search image selected from the search images displayed on the display unit 46 according to the command from the user is designated as the designation search image by the image designating unit 40, and only the designation search image is displayed on the display unit 46 by the image display unit 38.

Figure 15:
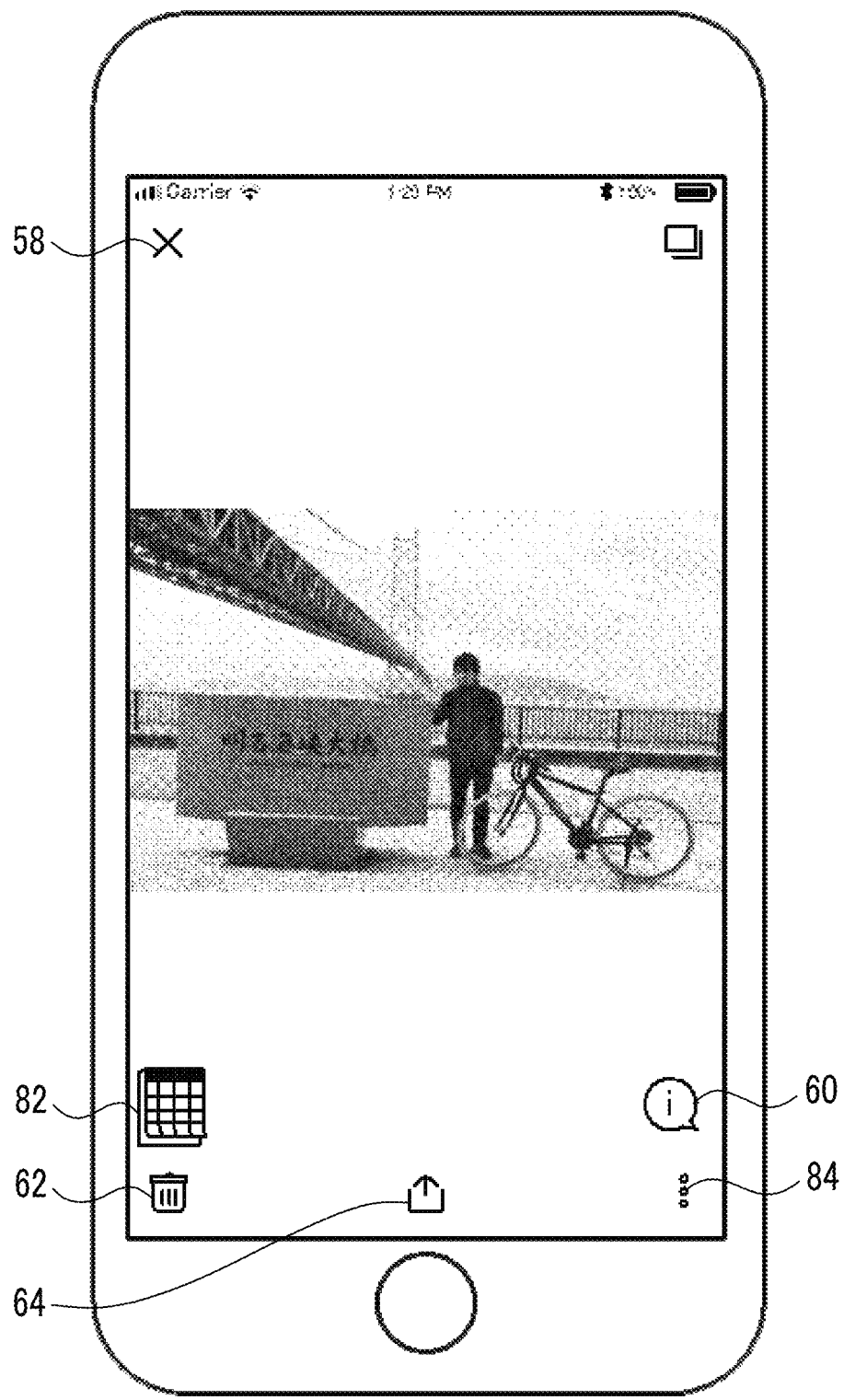
FIG. 15 is a conceptual diagram of an embodiment representing a browsing screen of a designation search image.

FIG. 15 is a conceptual diagram of an embodiment representing a browsing screen of the designation search image. The browsing screen of the designation search image is displayed on the entire surface of the display unit 46. The button 58 of "x" is displayed at an upper left portion of the browsing screen of the designation search image shown in FIG. 15, a button 82 of "calendar" is displayed at a lower left portion, and the button 60 of "information" is displayed at a lower right portion. The button 62 of "trash can", the button 64 of "share", and a button 84 of "others" are displayed at a lower portion of the browsing screen of the designation search image.

The browsing screen of the designation search image has the same configuration as that of the browsing screen of the designation image in addition to displaying the button 82 of "calendar" at a lower left portion thereof.

For example, the user can close the browsing screen of the designation search image by tapping the button 58 of "x", and can return to the list screen of the search image. The user can delete the designation search image by tapping the button 62 of "trash can", sharing the designation search image with another user by tapping the button 64 of "share", and can execute other functions by tapping the button 84 of "others". The user can browse the information of the designation search image by tapping the button 60 of "information".

The user can sequentially display and browse the search images one by one.

In this case, after only the designation search image is displayed on the display unit 46, only one search image captured earlier or later than the imaging timing of the designation search image from all the search images whenever the command from the user is input is sequentially displayed on the display unit 46 in order from the search image captured in a sequence of time from the imaging timing of the designation search image by the image display unit 38.

For example, in a case where the designation search image is swiped to the right side by the user, only one search image captured at an imaging timing earlier than the imaging timing of the designation search image by one timing among all the search images is displayed. Thereafter, only one search image is sequentially displayed one by one in order of the search images captured in a sequence of time from the imaging timing of the designation search image whenever the search image is swiped to the right side according to the command of the user.

Meanwhile, in a case where the designation search image is swiped to the left side by the user, only one search image captured at an imaging timing later than the imaging timing of the designation search image by one timing among all the search images is displayed. Thereafter, only one search image is sequentially displayed one by one in order from the search images captured in a sequence of time from the imaging timing of the designation search image whenever the search image is swiped to the left side according to the command of the user.

The user can display and browse the images captured earlier and later than the imaging timing of the designation search image on the display unit 46 among the image group by tapping the button 82 of "calendar" displayed on the browsing screen of the search image as shown in FIG. 15.

In this case, in a case where the designation search image is designated, after only the designation search image is displayed on the display unit 46, the designation search image and at least a part of the images which are included in the image group and captured earlier and later than the imaging timing of the designation search image are displayed in a sequence of time as time-series images on the display unit 46 by the image display unit 38 according to the command from the user.

As stated above, in order to display images captured earlier and later than an imaging timing of one search image, the user does not return to the list screen of the image such as the home screen once, and can display and browse the images captured earlier and later than the imaging timing of the designation search image in a sequence of time with one action of tapping the button 82 of "calendar" according to the command from the user in the present embodiment.

Here, even though the user returns to the list screen of the image such as the home screen according to the command from the user, it is possible to similarly display the images captured earlier and later than the imaging timing of the designation search image in a sequence of time. However, in such an operation method, in a case where a large amount of image groups for several years are stored in the smartphone, the user is urged to move between the image groups for years until a desired imaging day of the images on the list screen of the image such as the home screen.

In contrast, it is possible to display and browse the images captured earlier and later than the imaging timing of the designation search image in a sequence of time only by one action of tapping the button 82 of "calendar" by using the image processing device of the present embodiment. As described above, the present image processing device is very convenient as compared to a case where the user returns to the list screen of the image such as the home screen and the images captured earlier and later than the imaging timing of the designation search image are displayed in a sequence of time by using the related art.

Figure 16:
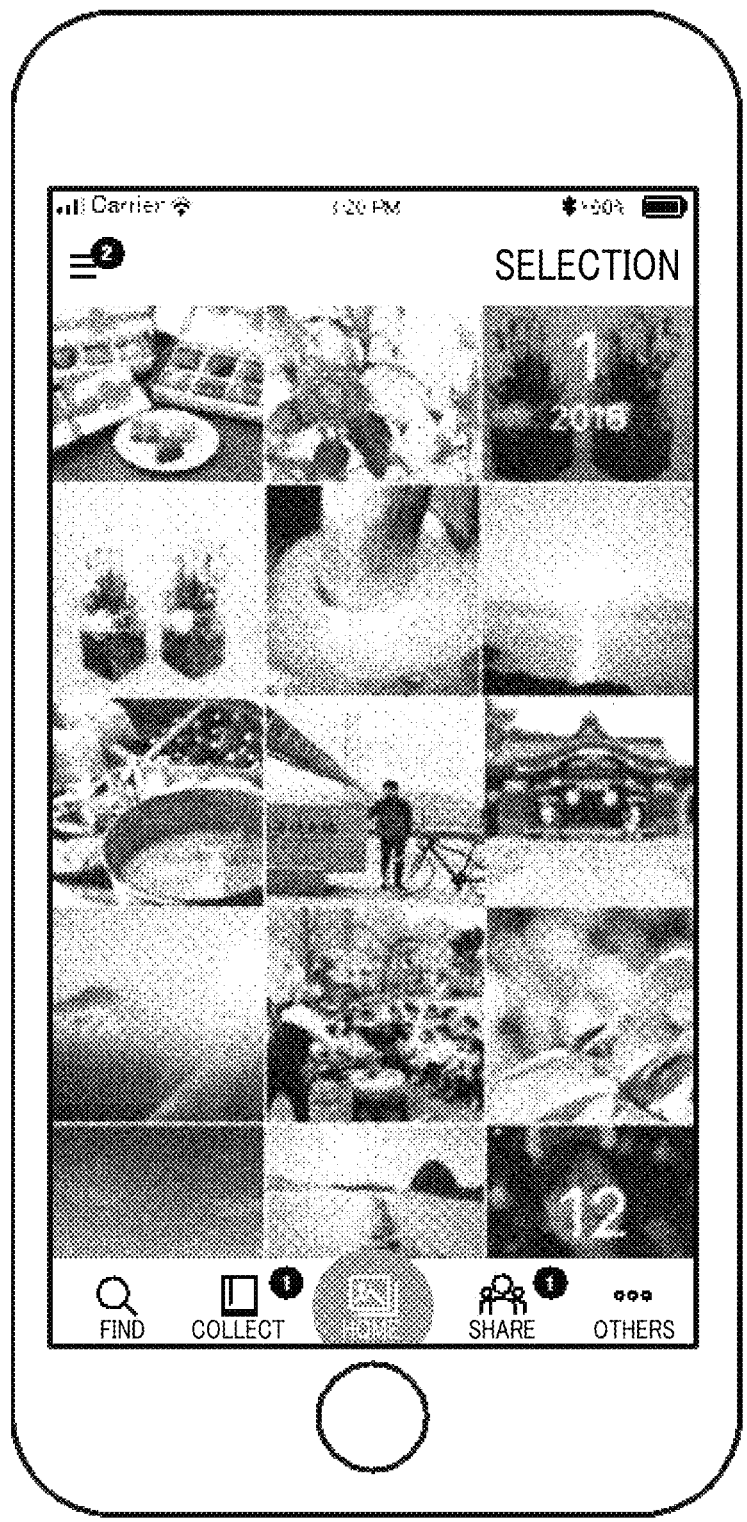
FIG. 16 is a conceptual diagram of an embodiment representing a list screen of time-series images.

FIG. 16 is a conceptual diagram of an embodiment representing a list screen of the time-series image. The list screen of the time-series image is displayed in a region between the menu region 52 and the navigation region 54.

Similarly, the user taps one time-series image desired to be browsed among time-series images displayed on the list screen of the time-series image, and thus, the user can display and browse only the tapped one time-series image on the display unit 46.

In this case, one time-series image selected from the time-series images displayed on the display unit 46 according to the command from the user is designated as a designation time-series image by the image designating unit 40, and only the designation time-series image is displayed on the display unit 46 by the image display unit 38.

In a case where the designation time-series image is designated, after only the designation time-series image is displayed on the display unit 46, only one image captured earlier or later than an imaging timing of the designation time-series image is sequentially displayed on the display unit 46 in order from the image captured in a sequence of time from the imaging timing of the designation time-series image among the image group by the image display unit 38 whenever the command from the user is input.

An operation in a case where the designation time-series image is swiped to the right side or the left side is the same as the operation in a case where the designation search image is swiped to the right side or the left side.

A specific touch operation may have the same function as that of the button 82 of "calendar" instead of providing the button 82 of "calendar".

The user can return to the list screen of the search image by tapping the button of "home" on the list screen of the time-series image.

As stated above, since the selection of the tag information is maintained until the selection thereof is released, in a case where the screen is returned to the list screen of the search image, the list of the search images which are the result searched by using the selected tag information is displayed on the list screen of the search image.

Before the time-series images are displayed on the display unit 46, the searching condition for searching for the images from the image group is not particularly limited as long as a condition other than the imaging timing of the image can be used as the condition for searching for the image from the image group.

In addition to the imaging timing of the image, the condition of the imaging timing of the image includes various condition related to the imaging timing of the image such as the imaging year, imaging month, imaging week, imaging day, and imaging timing of the image, and the condition other than the imaging timing of the image includes various conditions other than the conditions related to the imaging timing of the image.

The analysis content of the image using the image analyzing unit 22 and the name of the tag information assigned by the tag information assigning unit 26 can be used as the searching condition, and the name (person name and object name) of the subject appearing in the image, a name of the facial expression of the person, a name of the behavior of the person, a name of the emotion of the person, a scene name, an event name, a name of the preference of the user, and a name of the imaging location can be used.

Figure 17:
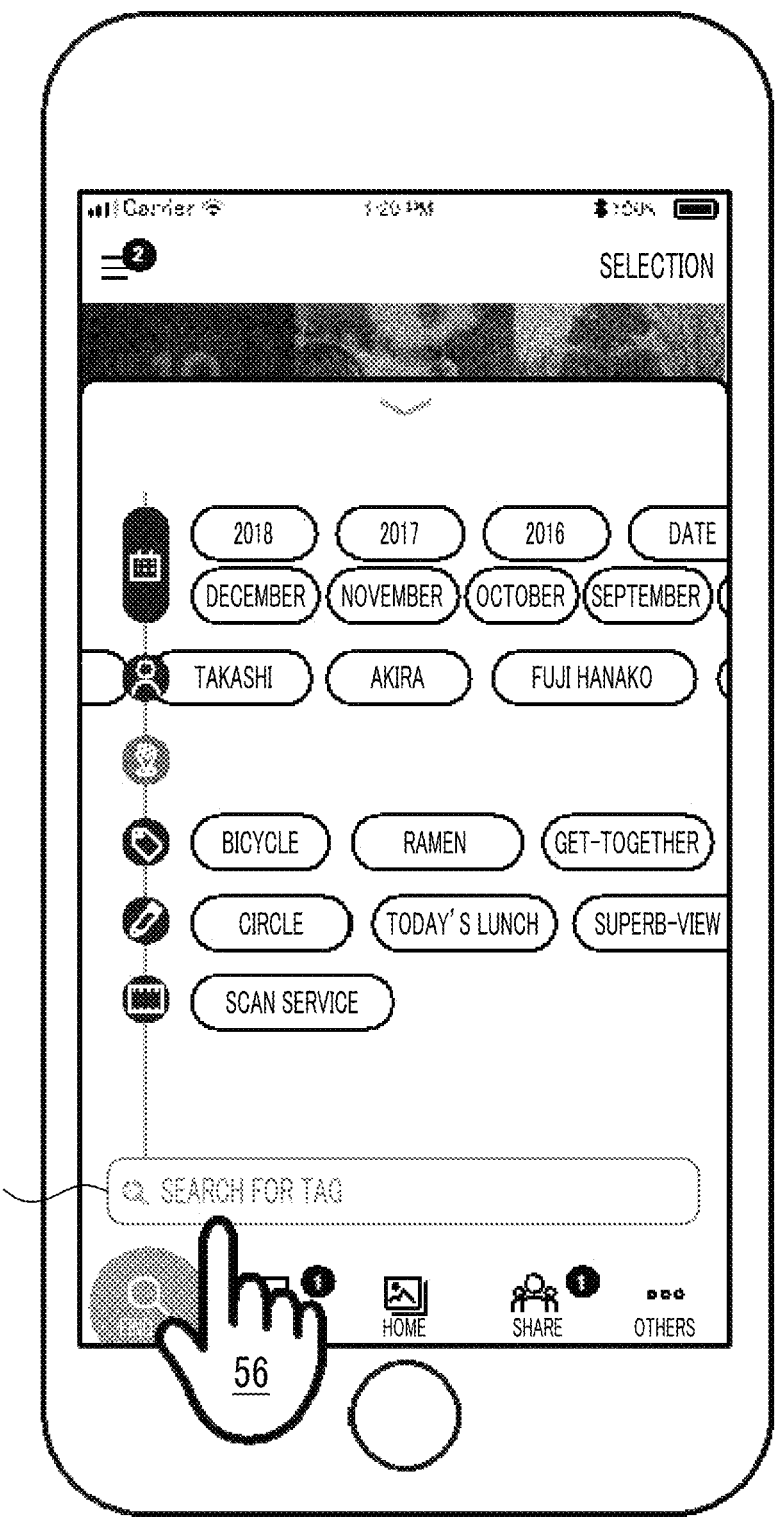
FIG. 17 is a conceptual diagram of an embodiment representing a scene in which a button of "search for tag" is tapped on the selection screen of the tag information.

In a case where the user cannot find the button of the tag information desired to be used as the searching condition on the selection screen of the tag information, the user can input the keyword by tapping the button 80 of "search for tag" and can search for the tag information as represented by the finger stamp 56 in FIG. 17.

Figure 18:
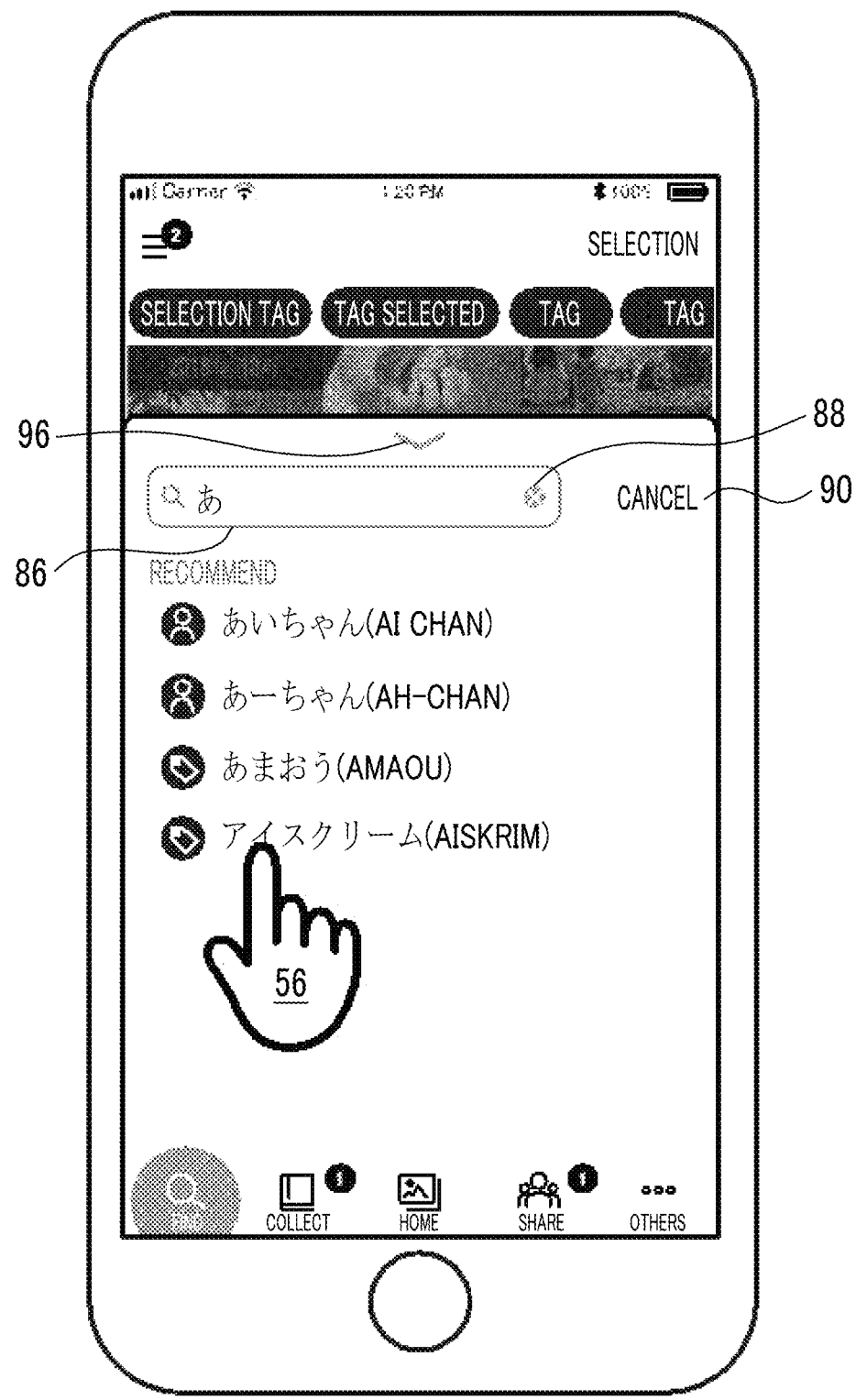
FIG. 18 is a conceptual diagram of an embodiment representing a search screen of the tag information.

In a case where the button 80 of "search for tag" is tapped, the search screen of the tag information is displayed on the display unit 46 as shown in FIG. 18.

The search screen of the tag information is displayed such that a list of search images in a lower layer is superimposed on an upper layer of a region other than a partial region on the upper side of the list screen of the image so as to be transparent at a predetermined transmittance. An input field 86 of the keyword is displayed at an upper portion of the search screen of the tag information. A message of "search for tag" for prompting the user to input the keyword is displayed in the input field 86 of the keyword. A button 88 of "x" is displayed at a right end portion within the input field 86 of the keyword, and a button 90 of "cancel" is displayed on a right side of the input field 86 of the keyword.

Subsequently, the keyword is input in the input field 86 of the keyword by the user.

In this case, the tag information of which at least a part matches the keyword input according to the command from the user is searched for as the search tag information among all the tag information assigned to all the images included in the image group by the tag information searching unit 36.

Subsequently, at least a part of the search tag information is displayed on the display unit 46 by the tag information display unit 30.

Subsequently, one search tag information selected according to the command from the user is designated among the search tag information displayed on the display unit 46 by the tag information designating unit 32.

Subsequently, the images to which one search tag information is assigned are extracted as the search images from the image group by the image extracting unit 34.

Subsequently, at least a part of all the search images is displayed on the display unit 46 by the image display unit 38.

Subsequently, at least a part of all the tag information assigned to all the search images is displayed on the display unit 46 by the tag information display unit 30.

For example, in order to search for tag information of "アイスクリーム (aiskrim: ice cream)", in a case where "あ (a)" is input in the input field 86 of the keyword as shown in FIG. 18, the tag information of which a part matches "あ (a)" are searched for as the search tag information among all the tag information assigned to all the images included in the image group by performing the partial match searching.

Subsequently, for example, buttons of tag information of "あいちゃん(Ai chan)", "あ 一ちゃん", "あまおう(amaou)", and "アイスクリーム(aiskrim: ice cream)" are displayed, as candidates of the search tag information, on the search screen of the tag information in this order from the upper side to the lower side, as shown in FIG. 18.

In a case where too many search tag information to be displayed are included on the search screen of the tag information, the user can push a part of the search tag information displayed on the search screen of the tag information to the outside by swiping the search tag information displayed on the search screen of the tag information in the up-down direction and moving a list of candidates of the search tag information in the up-down direction, and can display a part of the search tag information which are not displayed on the search screen of the tag information by moving the part of the search tag information into the search screen of the tag information.

The user can delete the keywords input in the input field 86 at once by tapping the button 88 of "x". The user can close the search screen of the tag information by tapping the button 90 of "cancel", and can return to the selection screen of the tag information. The user can close the search screen of the tag information anytime by swiping a downward arrow 96 displayed at an upper portion of the search screen of the tag information.

Subsequently, it is assumed that the button of, for example, the tag information of " ア イスクリーム(aiskrim: ice cream)" is tapped among buttons of candidates of the search tag information displayed on the search screen of the tag information by the user as represented by the finger stamp 56 in FIG. 18.

Figure 19:
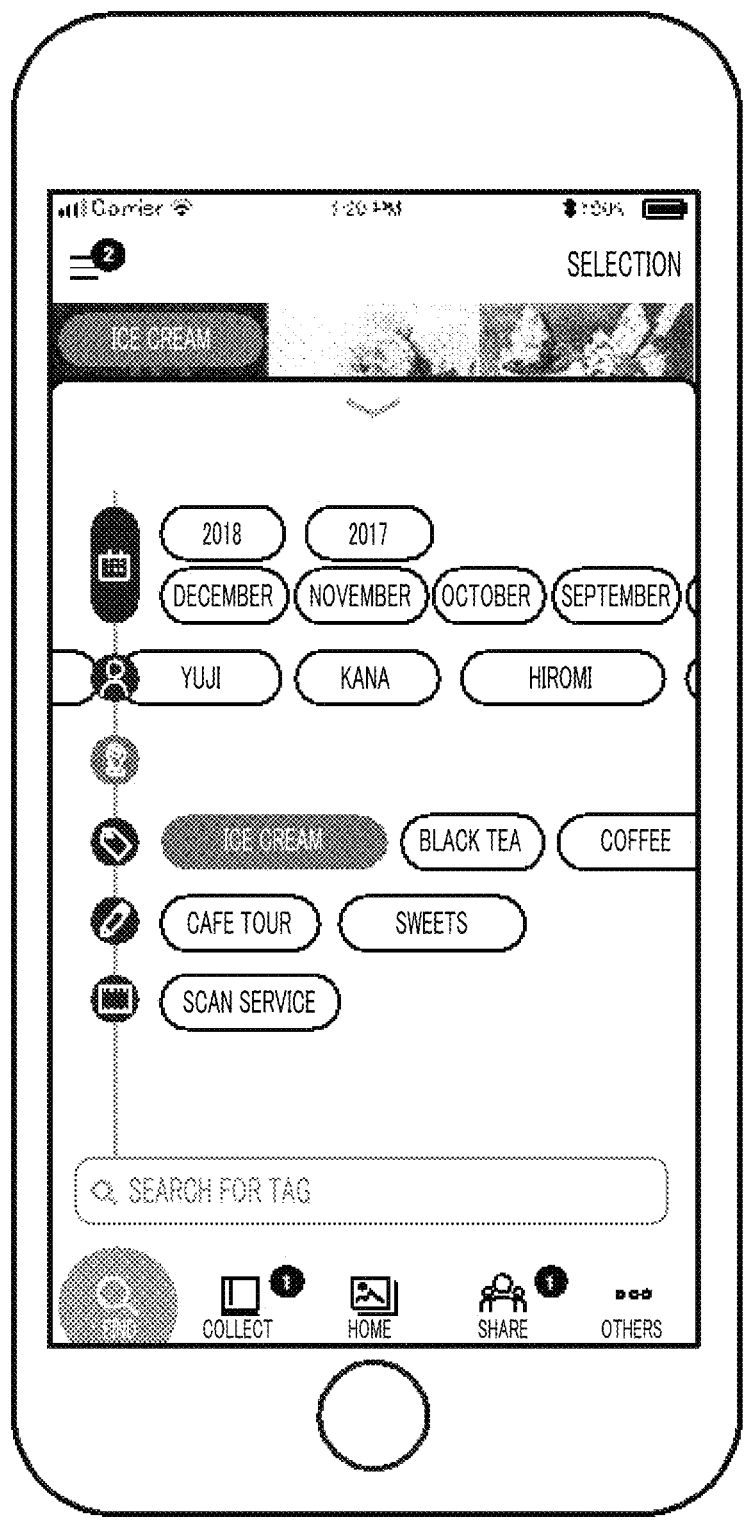
FIG. 19 is a conceptual diagram of an embodiment representing the selection screen of the tag information.
Figure 20:
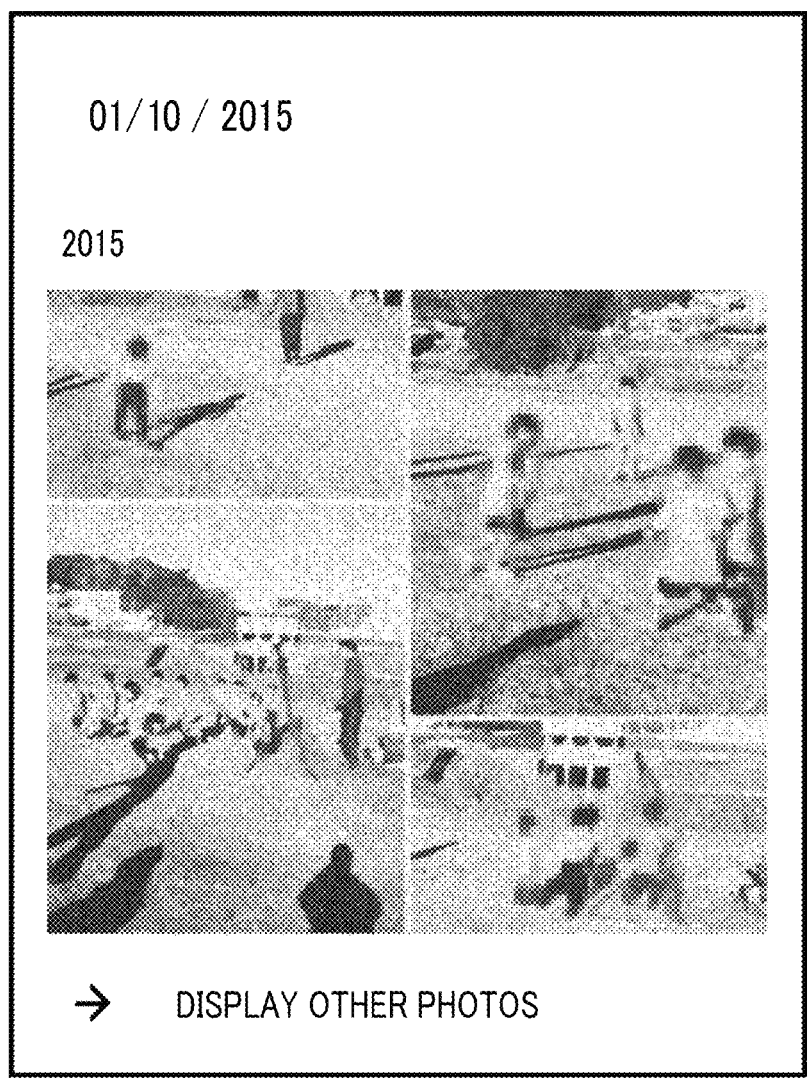
FIG. 20 is a conceptual diagram of an example representing a collage image created by using images selected from an image group of "2015, Jan. 10" owned by a user.
Figure 21:
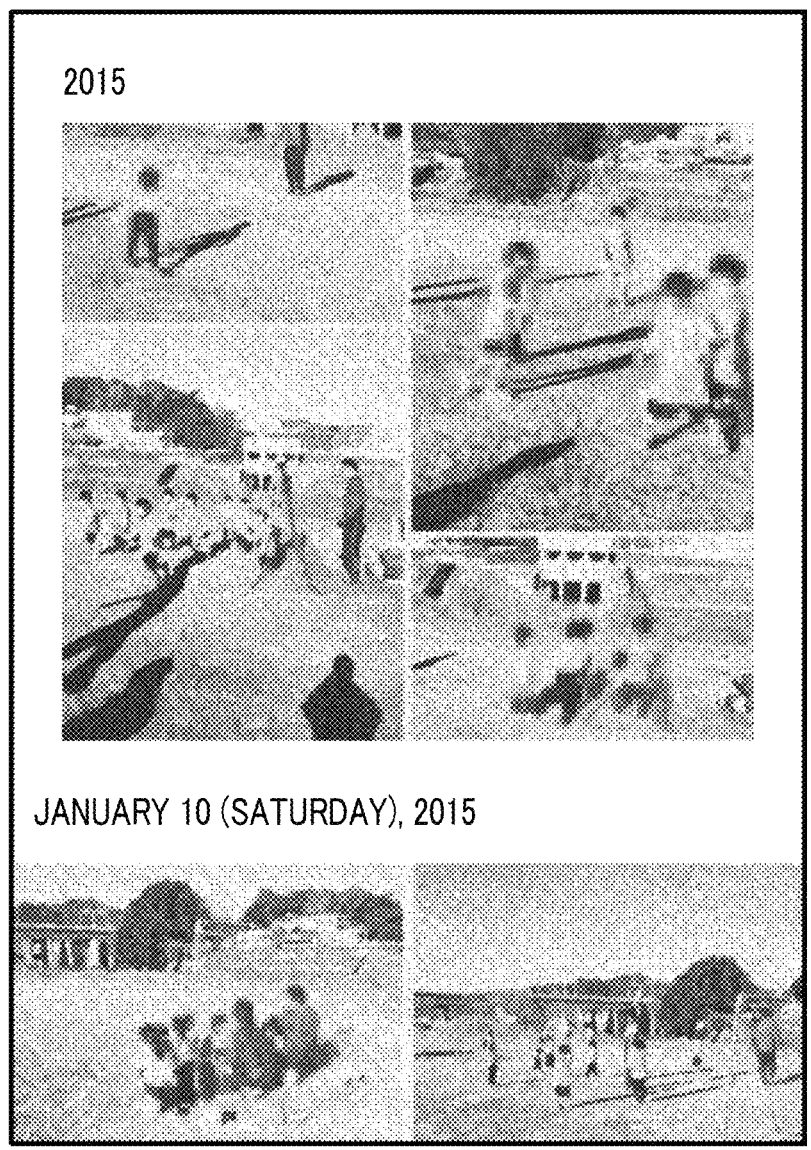
FIG. 21 is a conceptual diagram of an example representing an image group of "Jan. 10 (Saturday), 2015" of the same imaging day as that of the images used as the collage images.
Figure 22:
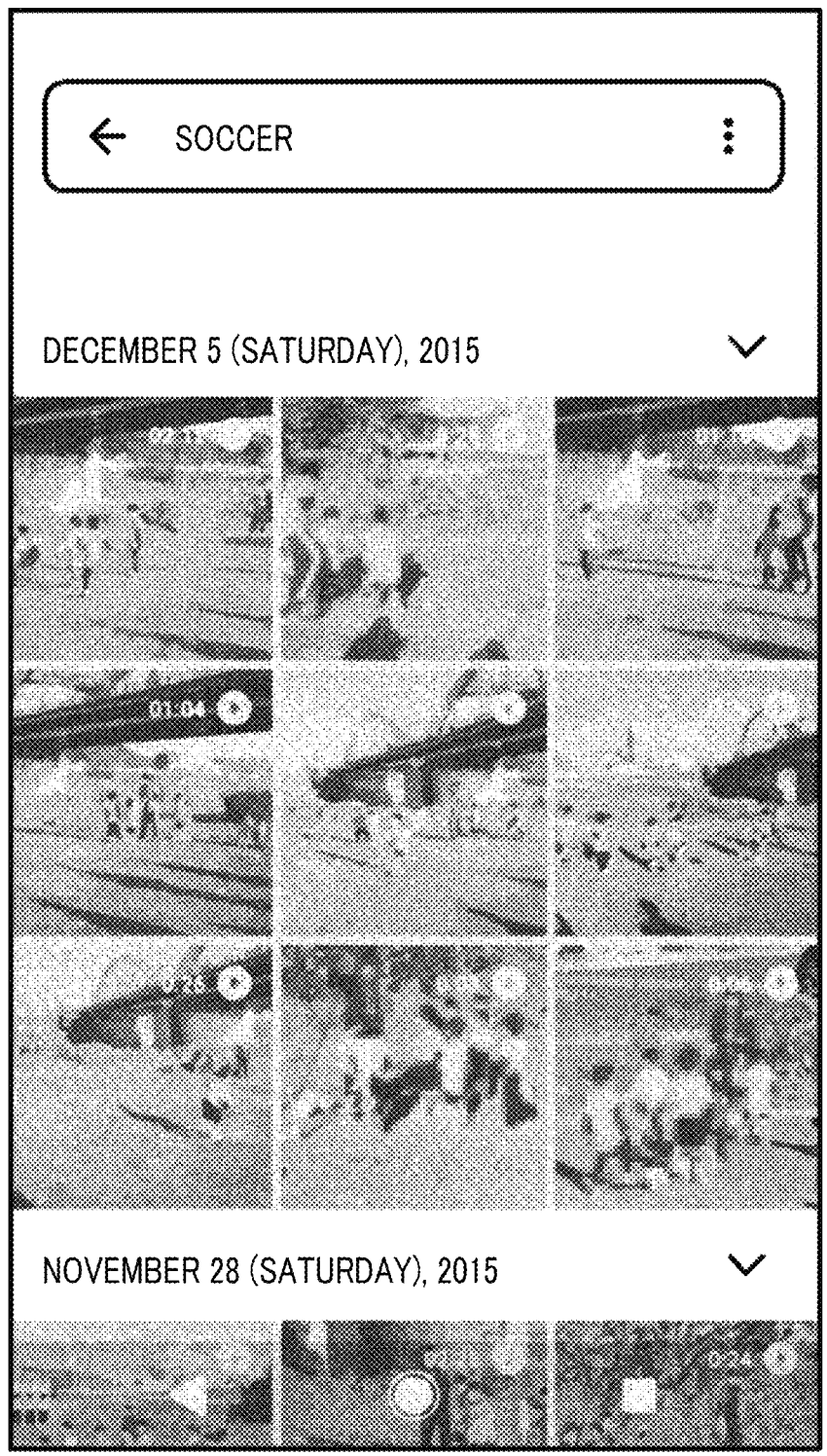
FIG. 22 is a conceptual diagram of an example representing an image corresponding to a keyword of "soccer".

In this case, the selection screen of the tag information is displayed on the display unit 46, as shown in FIG. 19. The subsequent operations are the same as those in a case of a state after the button of the tag information of "bicycle" is selected in a state in which any tag information is not selected.

That is, the tag information of "アイスクリーム(aiskrim: ice cream)" is designated as the selection tag information, and is displayed as "アイスクリーム(aiskrim: ice cream)" on the left side of the region at the upper portion of the list screen of the image which is not covered by the selection screen of the tag information as shown in FIG. 19.

Subsequently, the images to which the tag information of "アイスクリーム(aiskrim: ice cream)" which is the selection tag information is assigned are extracted as the search images from the image group, and the search images are displayed on the list screen of the image.

All the tag information assigned to the search images to which the tag information of "アイスクリーム(aiskrim: ice cream)" which is the selection tag information is assigned are displayed on the selection screen of the tag information.

The subsequent operations are the same as those in a case where the button of the tag information of "bicycle trip" is additionally tapped in a state in which the button of the tag information of "bicycle" is selected, and the user can additionally select the button of the tag information desired to be used as the searching condition.

For example, in a case where the user captures a new image, assigns new tag information to the image, or deletes the tag information already assigned to the image, the reliability of the tag information may be improved through machine learning using artificial intelligence (AI) based on the new image, the new tag information, or the deleted tag information.

For example, the server 12 may comprise at least a part of the functions of the client 14 such as the analysis of the image, the assignment of the evaluation value, the assignment of the tag information, the setting of the weight, the extraction of the image, and the search of the tag information, and the server 12 may execute at least a part of the functions.

For example, in the device according to the embodiment of the present invention, a hardware configuration of a processing unit that performs various processing of the command obtaining unit 18, the image analyzing unit 22, the evaluation value assigning unit 24, the tag information assigning unit 26, the weight setting unit 28, the tag information display unit 30, the tag information designating unit 32, the image extracting unit 34, the tag information searching unit 36, the image display unit 38, the image designating unit 40, the image information display unit 42, and the image information editing unit 44 may be dedicated hardware, or may be various processors or computers that perform programs.

Various processors include a central processing unit (CPU) which is a general purpose processor functioning as various processing units by executing software (program), a programmable logic device (PLD) which is a processor capable of changing a circuit configuration after a field programmable gate array (FPGA) is manufactured, and a dedicated electric circuit which is a processor having a circuit configuration designed as a dedicated circuit in order to perform specific processing such as application specific integrated circuit (ASIC).

One processing unit may be constituted by one of the various processors. One processing unit may be obtained by combining the same kind or different kinds of two or more processors, for example, by combining a plurality of FPGAs, or may be obtained by combining the FPGA and the CPU. The plurality of processing units may be constituted by one of the various processors or may be constituted by using one processor obtained by combining two or more of the plurality of processing units.

For example, one processor is constituted by combining one or more CPUs and software so as to be represented by the computers such as the server and the client, and this processor functions as the plurality of processing units. A processor that realizes the functions of the entire system including the plurality of processing units by using one integrated circuit (IC) chip is used so as to be represented by a system on chip (SoC).

More specifically, the hardware configuration of the various processors is an electric circuitry obtained by combining circuit elements such as semiconductor elements.

For example, a method according to the embodiment of the present invention can be implemented by a program causing a computer to execute steps. It is possible to provide a computer-readable recording medium having the program recorded thereon.

While the present invention has been described in detail, the present invention is not limited to the embodiment, and may be modified and change in various manners without departing the gist of the present invention.

EXPLANATION OF REFERENCES

10: image processing system
12: server
14: client
16: network
18: command obtaining unit 20: image retaining unit
22: image analyzing unit
24: evaluation value assigning unit
26: tag information assigning unit
28: weight setting unit
30: tag information display unit
32: tag information designating unit
34: image extracting unit
36: tag information searching unit
38: image display unit
40: image designating unit
42: image information display unit
44: image information editing unit
46: display unit
50: notification and status region
52: menu region
54: navigation region
56: finger stamp
58, 66, 88: button of "x"
60: button of "information"
62: button of "trash can"
64: button of "share"
68: button of "edit"
70: button of "add tag"
72, 78, 90: button of "cancel"
74: button of "save"
76: input field of new tag information
80: button of "search for tag"
82: button of "calendar"
84: button of "others"
86: input field of keyword
92, 94, 96: arrow

What is claimed is:

1. An image processing device comprising a processor configured to:
    display at least a part of every piece of tag information assigned to every piece of image included in an image group on a display;
    designate, as first selection tag information, tag information selected from the tag information displayed on the display according to a first command from a user, the first selection tag information being a searching condition for searching for an image from the image group according to a condition other than an imaging timing, and the imaging timing being date and time when the image is captured;
    extract first search images to which the first selection tag information are assigned from the image group;
    display search images from the first search images to which the first selection tag information are assigned, on the display, the first selection tag information being selected according to the first command from the user;
    display at least a part of every piece of the tag information assigned to every piece of the search images to which the first selection tag information are assigned, on the display, the first selection tag information being selected according to the first command from the user, and the tag information assigned to the first search images and displayed on the display including non-selection tag information assigned to the first search images and not selected by the user in the first command;
    designate, as a designation search image, one search image selected from the first search images displayed on the display according to a second command from the user; and
    display, as time-series images, the designation search image and at least a part of images which are included in the image group and captured earlier and later than an imaging timing of the designation search image in a sequence of time on the display according to a third command from the user in a case where the designation search image is designated.

2. The image processing device according to claim 1, wherein the processor is further configured to:
    sequentially display only one search image captured earlier or later than the imaging timing of the designation search image from the first search images on the display unit in order of the first search images captured in a sequence of time from the imaging timing of the designation search image whenever the third command from the user is input after only the designation search image is displayed on the display.

3. The image processing device according to claim 1, wherein the processor is further configured to:
    designate, as a designation time-series image, one time-series image selected from the time-series images displayed on the display according to the second command from the user; and
    display only one image captured earlier or later than an imaging timing of the designation time-series image on the display from the image group in order of the images captured in a sequence of time from the imaging timing of the designation time-series image whenever the third command from the user is input after only the designation time-series image is displayed on the display in a case where the designation time-series image is designated.

4. The image processing device according to claim 2, wherein the processor is further configured to:
    designate, as a designation time-series image, one time-series image selected from the time-series images displayed on the display according to the second command from the user; and
    display only one image captured earlier or later than an imaging timing of the designation time-series image on the display from the image group in order of the images captured in a sequence of time from the imaging timing of the designation time-series image whenever the third command from the user is input after only the designation time-series image is displayed on the display in a case where the designation time-series image is designated.

5. The image processing device according to claim 1, wherein the processor is further configured to:
    simultaneously designate second selection tag information selected from the tag information displayed on the display and assigned to the first search images according to the first command from the user in addition to the first selection tag information;
    extract second search images to which the second selection tag information is assigned from the first search images;
    display at least a part of the second search images on the display; and
    display at least a part of the tag information assigned to the second search images on the display.

6. The image processing device according to claim 1, wherein the processor is further configured to:
    simultaneously designate, as selection tag information, two or more tag information selected from the tag information displayed on the display according to the first command from the user;

extract, as search images, the images to which all the two or more selection tag information are assigned from the image group;

display at least a part of the search images on the display and display at least a part of the tag information assigned to the search images on the display.

7. The image processing device according to claim 2, wherein the processor is further configured to:

simultaneously designate, as selection tag information, two or more tag information selected from the tag information displayed on the display according to the first command from the user;

extract, as search images, the images to which all the two or more selection tag information are assigned from the image group;

display at least a part of the search images on the display; and display at least a part of the tag information assigned to the search images on the display.

8. The image processing device according to claim 3, wherein the processor is further configured to:

simultaneously designate, as selection tag information, two or more tag information selected from the tag information displayed on the display according to the first command from the user;

extract, as search images, the images to which all the two or more selection tag information are assigned from the image group;

display at least a part of the search images on the display and display at least a part of the tag information assigned to the search images on the display.

9. The image processing device according to claim 1, wherein the tag information is assigned to the images included in the image group, in advance.

10. The image processing device according to claim 1, wherein the tag information and images included in the image group are displayed in separate frames on a display screen.

11. An image processing method of an image processing device, the image processing method comprising:

designating, as first selection tag information, tag information selected from the tag information displayed on the display according to a first command from a user, the first selection tag information being a searching condition for searching for an image from the image group according to a condition other than an imaging timing, and the imaging timing being date and time when the image is captured;

extracting first search images to which the first selection tag information are assigned from the image group;

displaying search images from the first search images to which the first selection tag information are assigned, on the display, the first selection tag information being selected according to the first command from the user;

displaying at least a part of every piece of the tag information assigned to every piece of the search images to which the first selection tag information are assigned, on the display, the first selection tag information being selected according to the first command from the user, and the tag information assigned to the first search images and displayed on the display including non-selection tag information assigned to the first search images and not selected by the user in the first command;

designating, as a designation search image, one search image selected from the first search images displayed on the display according to a second command from the user; and displaying, as time-series images, the designation search image and at least a part of images which are included in the image group and captured earlier and later than an imaging timing of the designation search image in a sequence of time on the display according to a third command from the user after only the designation search image is displayed on the display in a case where the designation search image is designated.

12. A non-transitory computer-readable recording medium having a program causing a computer to execute steps of the image processing method according to claim 11 recorded thereon.

13. The image processing method according to claim 11, wherein the tag information is assigned to the images included in the image group, in advance.

* * * * *